(12) United States Patent
Kuroshima et al.

(10) Patent No.: US 7,756,985 B2
(45) Date of Patent: Jul. 13, 2010

(54) SHARED DEVICE CONTROL METHOD AND SERVER-CLIENT SYSTEM

(75) Inventors: Masashi Kuroshima, Kanagawa-ken (JP); Keiko Nakanishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1611 days.

(21) Appl. No.: 10/867,761

(22) Filed: Jun. 16, 2004

(65) Prior Publication Data

US 2005/0021795 A1 Jan. 27, 2005

Related U.S. Application Data

(62) Division of application No. 09/546,911, filed on Apr. 10, 2000, now Pat. No. 6,782,426.

(30) Foreign Application Priority Data

| Apr. 9, 1999 | (JP) | 11-102828 |
| Apr. 9, 1999 | (JP) | 11-103222 |
| Apr. 9, 1999 | (JP) | 11-103223 |

(51) Int. Cl.
*G06F 15/16* (2006.01)
*G06F 13/00* (2006.01)
(52) U.S. Cl. ...................... 709/228; 719/321
(58) Field of Classification Search .............. 709/224, 709/228; 715/733, 736; 719/321
See application file for complete search history.

(56) References Cited

U.S. PATENT DOCUMENTS

| 5,692,111 | A | * | 11/1997 | Marbry et al. ........... 358/1.15 |
| 5,987,535 | A | | 11/1999 | Knodt et al. ............... 710/15 |
| 6,023,585 | A | * | 2/2000 | Perlman et al. ............ 717/178 |
| 6,122,684 | A | | 9/2000 | Sakura ..................... 710/73 |
| 6,141,680 | A | * | 10/2000 | Cucchiara ................ 709/201 |
| 6,148,346 | A | * | 11/2000 | Hanson ................... 719/321 |
| 6,223,223 | B1 | * | 4/2001 | Kumpf et al. ............ 709/227 |
| 6,246,487 | B1 | * | 6/2001 | Kobayashi et al. ........ 358/1.13 |
| 6,269,481 | B1 | * | 7/2001 | Perlman et al. ........... 717/178 |
| 6,308,205 | B1 | * | 10/2001 | Carcerano et al. .......... 709/221 |
| 6,310,692 | B1 | * | 10/2001 | Fan et al. ................ 358/1.14 |
| 6,369,909 | B1 | * | 4/2002 | Shima .................... 358/1.15 |
| 6,429,952 | B1 | * | 8/2002 | Olbricht ................. 358/442 |
| 6,473,811 | B1 | | 10/2002 | Onsen .................... 710/15 |
| 6,785,023 | B1 | * | 8/2004 | Iida ..................... 358/442 |
| 6,832,247 | B1 | * | 12/2004 | Cochran et al. ........... 709/223 |
| 6,940,615 | B1 | * | 9/2005 | Shima ................... 358/1.15 |
| 7,246,147 | B2 | * | 7/2007 | Kim et al. ............... 709/203 |
| 2003/0120729 | A1 | * | 6/2003 | Kim et al. ............... 709/203 |

* cited by examiner

*Primary Examiner*—Douglas B Blair
(74) *Attorney, Agent, or Firm*—Fitzpatrick, Cella, Harper & Scinto

(57) ABSTRACT

Provide a shared device control method and server-client system, which inform the client user of the state of a shared device upon accessing the connectable shared device on the network, thereby preventing unwanted situations (for example, the user cannot determine what has happened; the user cannot obtain a desired access result; access results in other fatal errors; and so forth). A shared device, to be shared by a plurality of data processing apparatuses connected via a network, is controlled by one of the plurality of data processing apparatuses, and the other data processing apparatuses inquires of the data processing apparatus controlling the shared device, a reserve or ready state of the shared device, or a mode which displays a window via the network, prior to use of the shared device informs the client user of the state of the shared device.

9 Claims, 18 Drawing Sheets

US 7,756,985 B2

SHARED DEVICE CONTROL METHOD AND SERVER-CLIENT SYSTEM

This application is a division of application Ser. No. 09/546,911, filed Apr. 10, 2000 (pending).

FIELD OF THE INVENTION

The present invention relates to a shared device control method and a server-client system for controlling shared devices connected on the network.

BACKGROUND OF THE INVENTION

In a conventional server-client system of this type, reserve information of a device connected to a server is acquired as follows.

When a certain device, which is connected to a server system and is being used by a given client computer is accessed by another client computer in the same communication system, it is easy to inhibit the device from being used by the another client by indicating that the device is reserved or in use. Since the same communication system is used, all clients in the system can easily detect the states of devices as long as a system program holds information indicating that "a device is reserved or in use".

However, whether or not a device in another communication system is reserved cannot be easily discriminated from this communication system. For example, when a device to be used is a scanner connected to another system via a SCSI I/F, it cannot be determined, based on a SCSI command, if that device is reserved by another system program of an identical computer, and a TWAIN driver that handles this scanner does not normally discriminate whether or not that scanner is reserved.

Therefore, a conventional server-client program cannot determine whether a device connected to a server system is being used by another program in the server system computer, and simultaneous accesses often produce invalid results. Also, when an error has occurred while the server-client program is using that device, and an error message is displayed on only the display screen of the server system, the users of the client systems cannot determine what has happened.

For example, when simultaneous accesses have taken place during use of the scanner as a shared device, the image scanning mode becomes indeterminate, or a scan is done in the mode which was last set and an image desirable for a given user but is not desirable for the other user is output.

When a device connected to the server system is not ready, for example, its power switch is OFF, and the operator of the client operates that device connected to the server system, a program for controlling the device, which is registered in the server system, displays an error message on the display screen of the server system, and waits for confirmation by the user. For this reason, the operator of the server system must go to the site of the server to check if any message pertaining to the device is displayed on the display screen of that server system by the program for operating the registered device. In this case, if the operator finds an error message dialog displayed on the server, the operator must confirm and close the dialog window.

Therefore, in the conventional server-client program, when a device connected to the server system is not ready, the program for operating the device registered in the server system displays an error message on the server system, but no information is returned to the client system, and the client operator cannot determine what has happened.

Conventionally, when a client connected to the network scans an image using an image input device on the server side, some application software programs that start up the image input device do not display any window. In general, when a window is displayed, such mode is called a UI (User Interface) mode; when no window is displayed, such mode is called a UI-less mode (windowless mode). Most OCR application software programs and the like run in the UI-less mode.

For this reason, when a client scans an image using the image input device at the server side, if the scan control (driver) of the image input device used runs in the UI mode, a predetermined UI dialog is displayed only on the server, and no information is returned to the client, resulting in poor operability.

SUMMARY OF THE INVENTION

The present invention has been made in consideration of such prior arts, and has as its object to provide a shared device control method and server-client system, which start access to a connectable shared device on the network after it is checked if the device is reserved, thereby preventing unwanted situations (for example, a program on the server side displays an error message on the display screen of the server, but the client user cannot determine what has happened, the user cannot obtain a desired access result, access results in other fatal errors, and so forth) that may occur when access is started while the device is already in use by another system or the like.

It is another object of the present invention to provide a shared device control method and server-client system, which can prevent an unwanted image from being scanned when the shared device is an image input device.

In order to achieve the above objects, a shared device control method of the present invention is provided for allocating a shared device which can be shared by a plurality of information processing apparatuses connected via a network, wherein the shared device is controlled by one of the plurality of information processing apparatuses, hereafter referred to as home information processing apparatus, and each of the information processing apparatuses inquires the home information processing apparatus as to the state of the shared device prior to use of the shared device, and uses the shared device in accordance with the returned state of the shared device, and when the shared device is not available for use, informs the user to this fact. Note that there may be more than one home information processing apparatus, i.e., several information processing apparatuses, each controlling one or more shared devices. Note that the shared device is an image input device, which includes an image scanner.

A server-client system of the present invention is a server-client system in which a plurality of information processing apparatuses connected via a network serve as a server and/or client, comprising a shared device which is locally connected to one of the plurality of information processing apparatuses, and is shared by the plurality of information processing apparatuses; wherein each of the other information processing apparatuses comprises inquiry means for inquiring the information processing apparatus, to which the shared device is locally connected, the reserve state of the shared device prior to use of the shared device; determination means for determining in correspondence with the returned reserve state of the shared device if the shared device can be used; informing means for informing a user when the shared device is reserved; and the information processing apparatus to which the shared device is locally connected, comprises interpretation means for interpreting information received from each of the other information processing apparatuses; checking means for checking the reserve state of the shared device on the basis of information indicating whether or not a window is open; when the interpretation result indicates an inquiry about the reserve state of the shared device; and transmission means for transmitting the checked result to each of the other information processing apparatuses. Note that the checking means checks the reserve state of the shared device on the basis of information indicating whether or not a window is open. Also, the shared device is an image input device, which includes an image scanner.

An information processing apparatus of the present invention is an information processing apparatus included in a server-client system in which a plurality of information processing apparatuses connected via a network serve as a server and/or client; and can access, via the network, a shared device locally connected to one of the plurality of information processing apparatuses, and is shared by the plurality of information processing apparatuses; comprising inquiry means for inquiring of the information processing apparatus, to which the shared device is locally connected, the reserve state of the shared device, via the network, prior to use of the shared device; determination means for determining in correspondence with the returned reserve state of the shared device if the shared device can be used; and informing means for informing a user of that effect, when the shared device is reserved. Note that the informing means includes display means. Also, the shared device is an image input device, which includes an image scanner.

An information processing apparatus of the present invention is an information processing apparatus which is included in a server-client system in which a plurality of information processing apparatuses, connected, via a network, serve as a server and/or client, and to which a shared device shared by the plurality of information processing apparatuses is locally connected, comprising interpretation means for interpreting information received from each of other information processing apparatuses; checking means for checking the reserve state of the shared device on the basis of information indicating whether or not a window corresponding to the shared device is open, when the interpretation result indicates an inquiry on the reserve state of the shared device prior to user of the shared-device; and transmission means for transmitting the checked result to each of the other information processing apparatuses. Note that the checking means checks the reserve state of the shared device on the basis of information indicating whether or not a window corresponding to the shared device is open. Also, the shared device is an image input device, which includes an image scanner.

A storage medium of the present invention is a storage medium which stores a computer-readably control program for controlling an information processing apparatus which is included in a server-client system in which a plurality of information processing apparatuses, connected via a network, serve as a server and/or client, and can access, via the network, a shared device which is locally connected to one of the plurality of information processing apparatuses, and is shared by the plurality of information processing apparatuses, the control program including at least an inquiry program for inquiring the information processing apparatus to which the shared device is locally connected, the reserve state of the shared device, via the network, prior to use of the shared device; a determination program for determining in correspondence with a returned reserve state of the shared device if the shared device can be used; and an informing program for informing a user of that effect, when the shared device is reserved.

Also, a storage medium of the present invention is a storage medium which stores a computer-readably control program for controlling an information processing apparatus which is included in a server-client system in which a plurality of information processing apparatuses, connected via a network, serve as a server and/or client, and to which a shared device shared by the plurality of information processing apparatuses is locally connected, the control program including at least an interpretation program for interpreting information received from each of other information processing apparatuses; a checking program for checking the reserve state of the shared device on the basis of information indicating whether or not a window is open, when the interpretation result indicates an inquiry on the reserve state of the shared device prior to user of the shared device; and a transmission program for transmitting the checked result to each of the other information processing apparatuses.

Furthermore, a storage medium of the present invention is a storage medium which stores a computer-readably control program for controlling an information processing apparatus which is included in a server-client system in which a plurality of information processing apparatuses, connected via a network, serve as a server and/or client, and can access, via the network, a shared device which is locally connected to one of the plurality of information processing apparatuses, the control program including at least an inquiry program for inquiring information processing apparatus, to which the shared device is locally connected, a reserve state of the shared device via the network prior to use of the shared device; a determination program for determining in correspondence with the returned reserve state of the shared device if the shared device can be used; an informing program for informing a user of that effect, when the shared device is reserved, an interpretation program for interpreting information received from each of other information processing apparatuses; a checking program for checking the reserve state of the shared device on the basis of information indicating whether or not a window is open, when the interpretation result indicates an inquiry on the reserve state of the shared device prior to user of the shared device; and a transmission program for transmitting the checked result to each of the other information processing apparatuses.

Note that the shared device is an image input device, which includes an image scanner.

It is still another object of the present invention to provide a shared device control method and server-client system, which start access to a connected shared device on the network after it is checked if the device is ready, thereby preventing unwanted situations (for example, a program on the server side displays an error message on the display screen of the server, but the user cannot determine what has happened) that may occur when access is started while the device is not ready since, for example, shared device power switch is OFF.

In order to achieve the above object, a shared device control method of the present invention is for controlling a shared device to be shared by a plurality of information processing apparatuses connected via a network, wherein the shared device is locally connected to one of the plurality of information processing apparatuses, and each of other information processing apparatuses inquires the information processing apparatus, to which the shared device is locally connected, the ready state of the shared device prior to use of the shared device, and uses the shared device in accordance with the returned ready state of the shared device. Note that when the shared device is not ready, a message indicating so is sent to the user. Also, the shared device is an image input device, which includes an image scanner.

A server-client system of the present invention is a server-client system in which a plurality of information processing apparatuses connected, via a, network, serve as a server and/or client, comprising a shared device which is locally connected to one of the plurality of information processing apparatuses, and is shared by the plurality of information processing apparatuses, wherein each of other information processing apparatuses comprises inquiry means for inquiring of the information processing apparatus, to which the shared device is locally connected, the ready state of the shared device prior to use of the shared device; and determination means for determining in correspondence with the returned ready state of the shared device if the shared device can be used; and the information processing apparatus to which the shared device is locally connected, comprises interpretation means for interpreting information received from each of other information processing apparatuses; checking means for checking the ready state of the shared device on the basis of information indicating whether or not a window is open when the interpretation result indicates an inquiry on the ready state of the shared device; and transmission means for transmitting a checking result to each of the other information processing apparatuses. Note that each of the other information processing apparatuses further comprises informing means for informing a user of that effect, when the shared device is not ready. The checking means checks the ready state of the shared device on the basis of a reply from the shared device that complies with a local connection protocol. Furthermore, the shared device is an image input device, which includes an image scanner.

An information processing apparatus of the present invention is included in a server-client system in which a plurality of information processing apparatuses connected, via a network, serve as a server and/or client, and can access, via the network, a shared device which is locally connected to one of the plurality of information processing apparatuses, and is shared by the plurality of information processing apparatuses, comprising inquiry means for inquiring of the information processing apparatus, to which the shared device is locally connected, the ready state of the shared device, via the network, prior to use of the shared device; and determination means for determining, in correspondence with the returned ready state of the shared device, if the shared device can be used. Note that the apparatus further comprises informing means for informing a user, when the shared device is reserved, to that effect. The informing means includes display means. Also, the shared device is an image input device, which includes an image scanner.

An information processing apparatus of the present invention is included in a server-client system in which a plurality of information processing apparatuses connected, via a network, serve as a server and/or client, and to which a shared device shared by the plurality of information processing apparatuses is locally connected, comprising interpretation means for interpreting information received from each of other information processing apparatuses; checking means for checking the ready state of the shared device on the basis of information indicating whether or not a window corresponding to the shared device is open when the interpretation result indicates an inquiry on the ready state of the shared device; and transmission means for transmitting the checked result to each of the other information processing apparatuses. Note that the checking means checks the ready state of the shared device on the basis of a reply from the shared device that complies with a local connection protocol. Also, the shared device is an image input device, which includes an image scanner.

A storage medium of the present invention is a storage medium which stores a computer-readably control program for controlling an information processing apparatus which is included in a server-client system in which a plurality of information processing apparatuses connected, via a network, serve as a server and/or client, and can access, via the network, a shared device which is locally connected to one of the plurality of information processing apparatuses, and is shared by the plurality of information processing apparatuses, the control program including at least an inquiry program for inquiring of the information processing apparatus to which the shared device is locally connected, a ready state of the shared device via the network prior to use of the shared device, a determination program for determining in correspondence with the returned ready state of the shared device if the shared device can be used, and an informing program for informing a user of that effect, when the shared device is not ready.

Also, a storage medium of the present invention is a storage medium which stores a computer-readably control program for controlling an information processing apparatus which is included in a server-client system in which a plurality of information processing apparatuses, connected, via a network, serve as a server and/or client, and to which a shared device shared by the plurality of information processing apparatuses is locally connected, the control program including at least an interpretation program for interpreting information received from each of other information processing apparatuses, a checking program for checking the ready state of the shared device on the basis of information indicating whether or not a window is open, when the interpretation result indicates an inquiry on the ready state of the shared device prior to use of the shared device, and a transmission program for transmitting a checking result to each of the other information processing apparatuses.

Furthermore, a storage medium of the present invention is a storage medium which stores a computer-readably control program for controlling an information processing apparatus which is included in a server-client system in which a plurality of information processing apparatuses, connected via a network, serve as a server and/or client, and can access, via the network, a shared device which is locally connected to one of the plurality of information processing apparatuses, the control program including at least an inquiry program for inquiring of the information processing apparatus to which the shared device is locally connected, the ready state of the shared device via the network prior to use of the shared device, a determination program for determining in correspondence with the returned ready state of the shared device if the shared device can be used, and an informing program for informing a user of that effect, when the shared device is not ready, an interpretation program for interpreting information received from each of other information processing apparatuses, a checking program for checking the ready state of the shared device on the basis of information indicating whether or not a window is open, when the interpretation result indicates an inquiry about the ready state of the shared device prior to use of the shared device, and a transmission program for transmitting a checking result to each of the other information processing apparatuses.

Note that the shared device is an image input device, which includes an image scanner.

It is still another object of the present invention to provide a network terminal device and its image input method, which can improve operability for the user when an image is input from an image input device which can be shared by a terminal device connected on the network.

In order to achieve the above object, the present invention provides a network terminal apparatus which inputs an image from an image input device that can be shared on a network, comprising instruction means for instructing the image input device to scan an image; checking means for checking whether the mode of an image scan process in the image input device instructed by the instruction means is the mode that displays a window, or the mode that does not display any window; and informing means for informing a user by a message when a checking result of the checking means indicates the mode that displays the window, wherein the user instructs the image scan process to scan an image in accordance with the message of the informing means.

In order to achieve the above object, the present invention provides a image input method for a network terminal apparatus which inputs an image from an image input device that can be shared on a network, comprising an instruction step of instructing the image input device to scan an image; a checking step of checking whether a mode of an image scan process in the image input device instructed in the instruction step is a mode that displays a window; or a mode that does not display any window; and an informing step of informing a user by a message when a checking result of the checking step indicates the mode that displays the window, wherein the user instructs the image scan process to scan an image in accordance with the message of the informing step so as to input an image.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

The preferred embodiments of the present invention will be described in detail hereinafter with reference to the accompanying drawings.

First Embodiment

<Example of Arrangement of Server-client System of this Embodiment>

Figure 1:
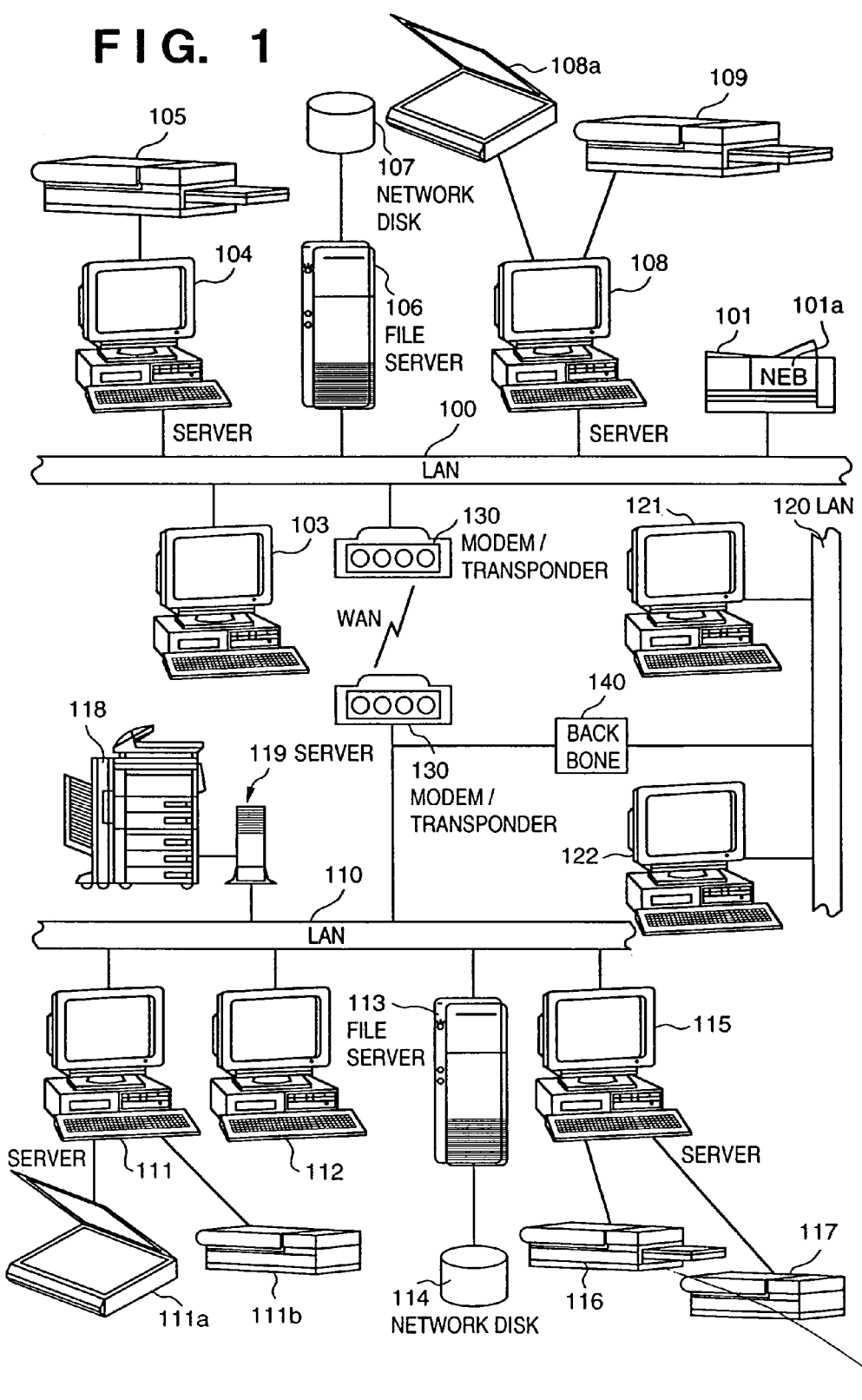
FIG. 1 is a diagram showing an example of a server-client system according to the embodiments of the present invention.

FIG. 1 shows an example of a large-scale network to which an embodiment of the present invention is applied.

Referring to FIG. 1, a network board (NEB) 101a connects a printer 101 having an open architecture to a local area network (LAN) 100 via a LAN interface such as an Ethernet interface 10Base-2 having a coaxial connector, 10Base-T having RJ-45, or the like.

A personal computer (PC) such as a PC 103 or the like is also connected to the LAN 100, and the PC 103 can communicate with the NEB 101a under the control of a network operating system. In this state, for example, the PC 103 can be designated to serve as a network management unit. Also, a printer such as a printer 105 or the like may be connected to the PC 103.

A file server 106 is connected to the LAN 100 and manages accesses to files stored in a large-capacity (e.g., 10 billion bytes) network disk 107. A print server 104 controls the printer 105 connected thereto or a remote printer 109 to print. Other peripheral devices (not shown) may be connected to the LAN 100.

Furthermore, a scanner server 108 is connected to the LAN 100, and a scanner 108a and printer 109 are connected to the server 108.

The network shown in FIG. 1 can use network software such as software available from Novell Inc., software written in UNIX, or the like to attain efficient communications among various network members. The network software used is not particularly limited. For example, NetWare (tradename of Novell Inc.) software available from Novell Inc. can be used. Refer to an on-line documentation contained in a NetWare package for details of this software package, which can be purchased from Novell Inc. together with the NetWare package.

The arrangement shown in FIG. 1 will be briefly explained below. The file server 106 serves as a file managing unit, which receives, stores, queues, caches, and transmits data files among LAN members. For example, data files created by the PC 103 are sent to the file server 106, which arranges these data files in a given order, and sends them to the printer 105 in accordance with a command from the print server 104. The PC 103, print server 104, and scanner server 108 comprise normal PCs, which can transmit generated data files onto the LAN 100, receive files from the LAN 100, and display and/or process such files.

Note that FIG. 1 depicts the PC 103, print server 104, and scanner server 108 as personal computers, but other computers suitable for executing network software may be included. For example, when software written in UNIX is used, a UNIX workstation may be included in the network. Such workstation can be used together with the illustrated PCs in an appropriate situation.

Normally, a LAN (e.g., the LAN 100) provides services to a local user group such as a user group in one or a plurality of successive floors in a building. For example, when a given user is a distant away from another user (for example, that user is located in another building or another prefecture), a wide-area network (WAN) may be formed. The WAN is basically a set of LANs connected via high-speed digital lines such as Integrated Services Digital Network (ISDN) lines. Therefore, as shown in FIG. 1, the LAN 100 is connected to LANs 110 and 120 via modulators/demodulators (MODEMs)/transponders and a back bone 140 to form a WAN. These connections are simple electrical connections using some buses. Each LAN includes dedicated PCs, and normally includes a file server and print server, which are not always required.

Therefore, as shown in FIG. 1, devices connected to LAN 110 includes a PC 112, file server 113, network disk 114, print server 115, printers 116 and 117, scanner server 111, scanner 111a and printer 111b, copying machine 118, and copying machine server 119. By contrast, devices connected to the LAN 120 includes only PCs 121 and 122. The devices connected to the LANs 100, 110, and 120 can access functions of other LANs via the WAN connections.

As an implementation example of an agent, an agent may be mounted on a network board for connecting a printer or scanner to the network. With this arrangement, a printer, scanner, or a copying machine can be managed by network management software. The user can acquire information of the printer, scanner, and copying machine to be controlled using network management software, or can change their states. More specifically, character strings displayed on liquid crystal displays of the individual devices can be acquired, or the default paper cassette selection on these devices can be changed. FIG. 1 shows an example wherein the network board (NB) on which an agent is mounted is connected to the printer.

<Example of Arrangement of Scanner Server of this Embodiment>

Figure 2:
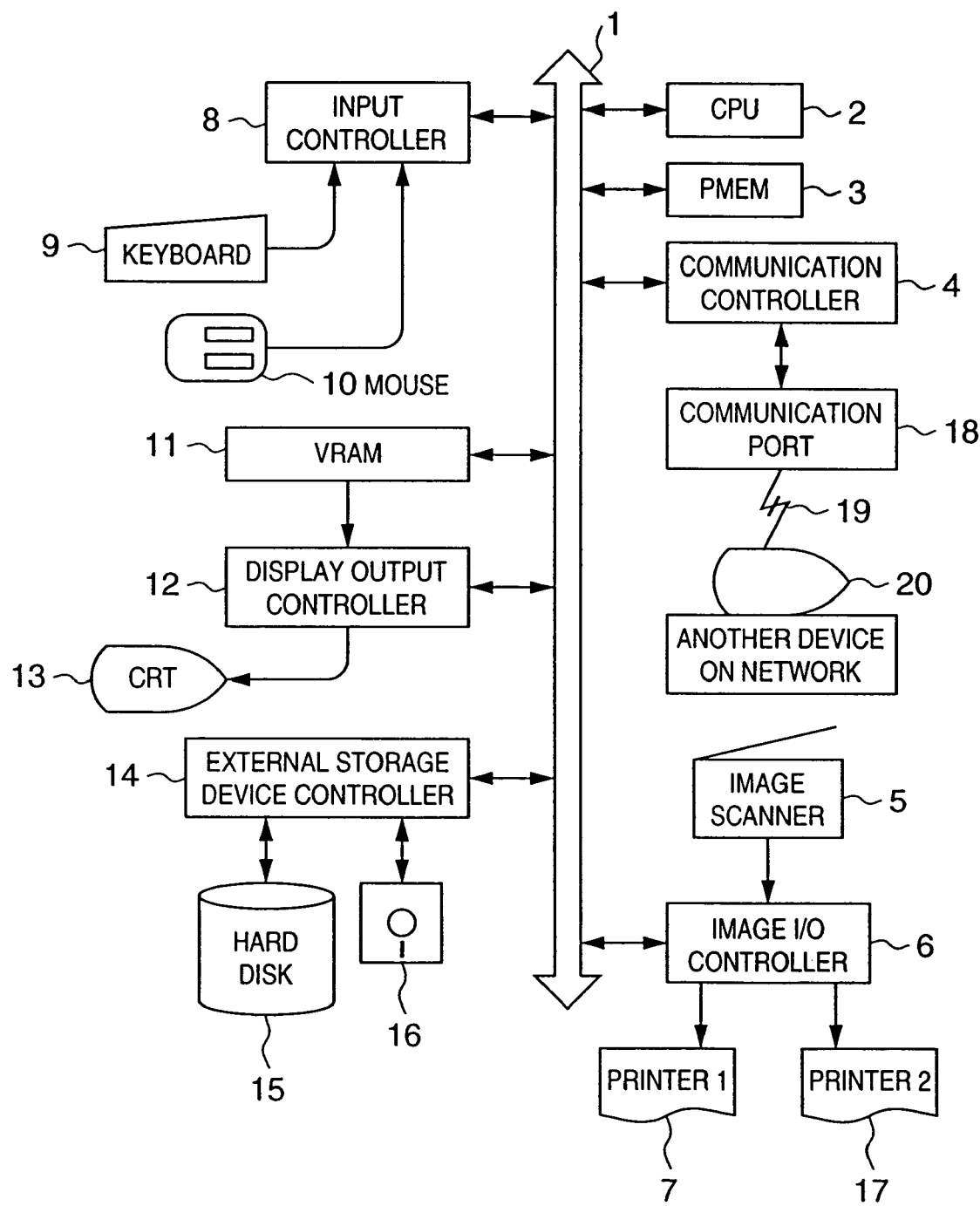
FIG. 2 is a block diagram showing an example of a server/client of the embodiments.

FIG. 2 is a block diagram showing an example of the arrangement of a scanner server as an image scanner of this embodiment.

Reference numeral 1 denotes a system bus, to which building blocks to be described below are connected. Reference numeral 2 denotes a CPU (Central Processing Unit). Reference numeral 3 denotes a program memory (to be abbreviated as a PMEM hereinafter), in which programs for various processes such as an image/document edit process, scanner control, and the like, which are selected as needed from a hard disk 15, are loaded, and are executed by the CPU 2. Created data is stored in the PMEM which also serves as a data memory, and is also used to temporarily store text data input by the user at a keyboard 9. Reference numeral 4 denotes a communication controller for controlling I/O data of a communication port 18. A signal output from the communication port 18 is sent to a communication port of another device on the network via a communication line 19. Reference numeral 20 denotes another device (a client in this embodiment) connected via the communication line 19. In this embodiment, a description will be given in association with a network such as a LAN or the like. However, the present invention can be applied even when the communication port and communication line connected to the communication controller comprise another communication means such as a public network or the like.

Reference numeral 5 denotes an image scanner; 6, an image I/O controller; and 7 and 17, printers. An image scanned by the image scanner 5 is mapped on the PMEM 3 and then on a VRAM 11, and is displayed on a CRT 13. Reference numeral 8 denotes an input controller to which input devices including the keyboard 9, a PD (pointing device) 10, and the like are connected. The operator inputs operation instructions of the system by operating the keyboard 9. Also, the PD 10 is used to select or edit image information, character data, and numerical value data on the CRT 13 or to set scan parameters, and a mouse is used in this embodiment. By arbitrarily moving a mouse cursor on the CRT 13 in the X- and Y-directions, menu selection, and selection and edit of image data, graphic data, character data, numerical value data, and scan parameters can be attained.

Reference numeral 11 denotes a video image memory (to be referred to as VRAM hereinafter); 12, a display output controller; and 13, a CRT. The data to be displayed on the CRT 13 is mapped as bitmap data on the VRAM 11. For example, in case of graphic data, a graphic pattern corresponding to its position and rendering attribute information is mapped on the VRAM, or can be displayed by directly generating a cursor on the display area of the VRAM by software control. Reference numeral 14 denotes an external storage device controller; and 15 and 16, data file disks for recording image data, graphic data, character data, numerical value data, and the like. For example, a hard disk (to be abbreviated as HD hereinafter) 15 and a floppy disk (to be abbreviated as FD hereinafter) 16 may be used. In this embodiment, the HD 15 stores programs that implement a scanner selection function, scanner state display function, scanner control function, server expansion function, network server function, and the like. As a storage medium that stores these programs, other devices such as a ROM, the floppy disk 16, a CD-ROM, a memory card, a magnetooptical disk, and the like may be used.

Note that though the image I/O controller 6 controls the image scanner 5 and the printers 7, 17 in FIG. 2, the image I/O controller 6 may be divided to an image input controller controlling the image scanner 5 and an image output controller controlling the printers 7, 17, or the image input controller and the image scanner may be in a body.

Note that the blocks of the client are basically the same as those in FIG. 2. However, the client has no I/O device such an image scanner or a printer, and may use I/O devices connected to the server. Also, the server or client may be constructed as a copying machine that integrates a scanner and printer, or as a facsimile apparatus.

Figure 3:
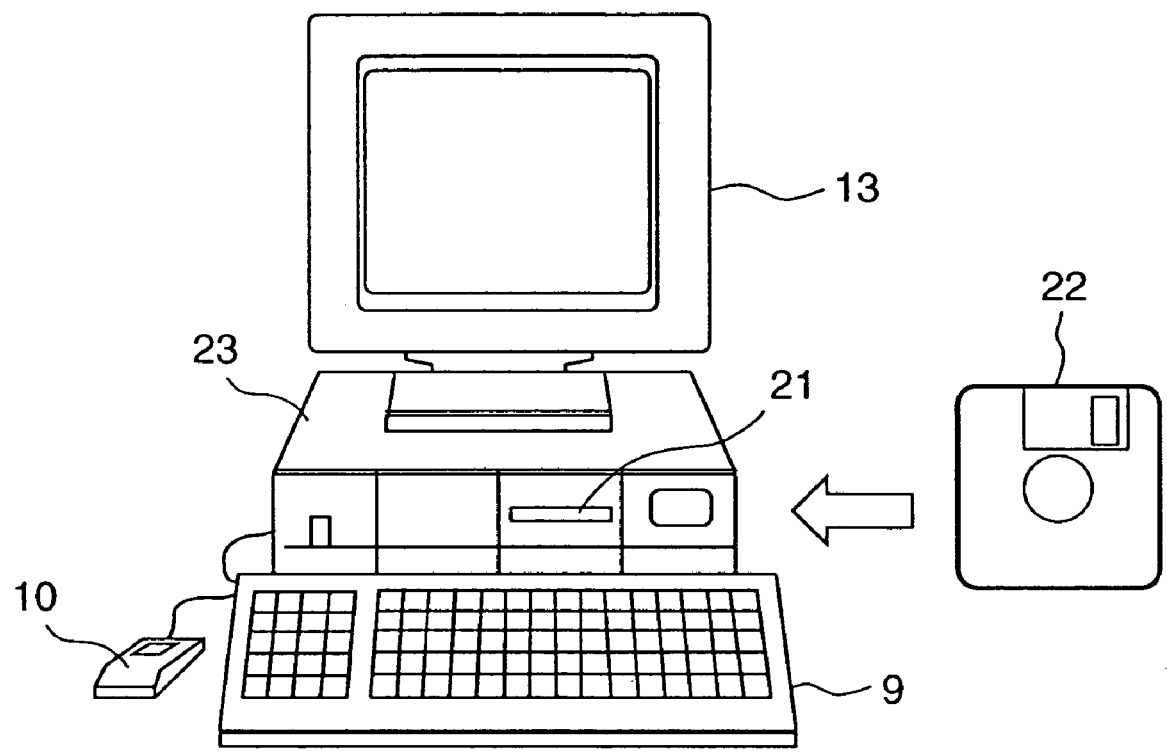
FIG. 3 shows an outer appearance of the server/client of the embodiments.

FIG. 3 shows the external appearance of the server of this embodiment.

Reference numeral 23 denotes a main body of the server which incorporates the system bus 1, CPU 2, PMEM 3, and communication controller 4. Reference numeral 13 denotes a CRT; 9, a keyboard; 10, a PD; and 21, an FD drive, which receives an FD 22 to write image data, graphic data, character data, or numerical value data on the FD 22 or to read such data recorded thereon. The outer appearance of the client is the same as that shown in FIG. 3.

Note that this embodiment is implemented by the server or client that records various programs in the HD 15. Also, this embodiment can be achieved by storing programs that can implement the functions of this embodiment in a recording medium, which is supplied to another system, server, or client, and reading out and executing program codes stored in the recording medium by a computer of the system or server/client. For example, this embodiment can be implemented by another server or client by setting the FD 22 that records a scanner selection program, scanner state display program, scanner control function program, server expansion function program, and network server function program in the FD drive 21 of another server, loading these programs onto the HD 15, and executing the loaded programs.

<Example of Functional Arrangement of Server and Client of this Embodiment>

Figure 4:
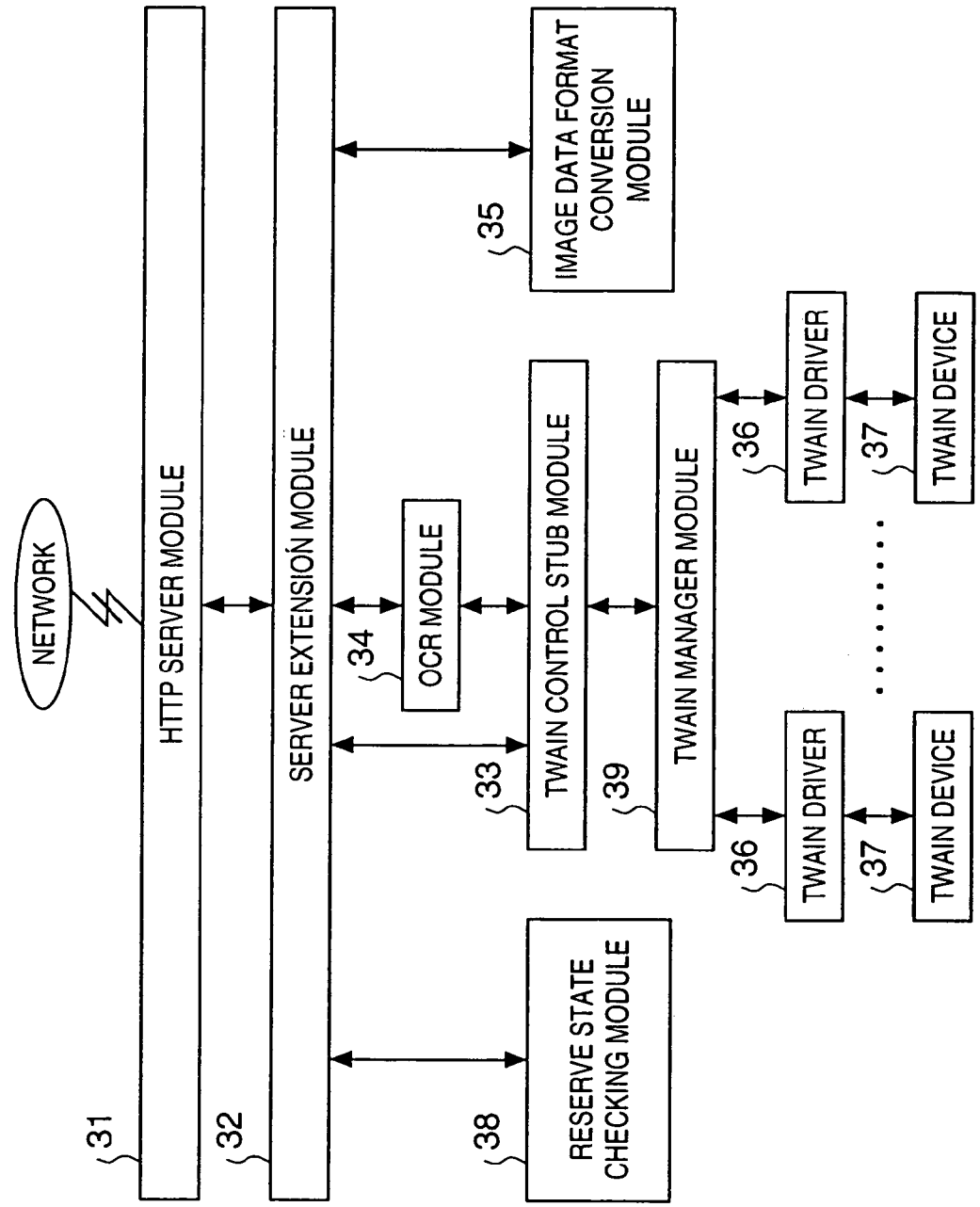
FIG. 4 is a diagram showing an example of the module arrangement of a program of the server of the first embodiment.

FIG. 4 shows an example of the functional arrangement in the image scanner server of this embodiment. In this embodiment, the following explanation will be given assuming that a TWAIN device having a versatile interface is used as an image scanner, and an HTTP protocol is used as a versatile network protocol for controlling exchange of scanned image data.

Reference numeral 31 denotes an HTTP server module which executes a process for transmitting data created on the server to a client using the HTTP protocol, or passing on information designated by the client to a server expansion module 32.

The server expansion module 32 interprets information passed on from the HTTP server module to control a TWAIN control STUB module 33, OCR module 34, image data format conversion module 35, and device reserve state checking module 38, and finally transfers data scanned by the TWAIN device connected to the server to a client using the HTTP server module 31.

The TWAIN control STUB module 33 executes a list-up process of a plurality of TWAIN drivers 36 connected via a TWAIN manager module 39, and a selection process of a TWAIN driver from them in accordance with a client instruction, sets parameters in the selected driver, and passes on image data obtained as a result to the server expansion module 32.

The OCR module 34 is called from the server expansion module 32 and executes character recognition upon receiving a request, from a client, for converting image data scanned by each TWAIN device 37 into text data.

The image data format conversion module 35 converts the format of image data obtained by each TWAIN device 37 into the format designated by a client.

The TWAIN drivers 36 are modules for individually controlling a plurality of TWAIN devices 37 connected to the server.

In this embodiment, since the TWAIN control STUB module 33 communicates with these TWAIN drivers 36 using a versatile TWAIN interface via the TWAIN manager module 39, an arbitrary TWAIN device 37 (and corresponding TWAIN driver 36) can be shared on the network.

The device reserve state checking module 38 checks the reserve state of each TWAIN device 37 via the TWAIN manager module 39 without using any TWAIN driver upon receiving from the client a check request of the reserve state of a device to be used via the HTTP server module 31. For example, each TWAIN driver 36 starts its execution process in response to an open request from the TWAIN manager module 39, and ends its process in response to a close request. During the execution process, each TWAIN driver 36 generates a window for the purpose of exchanging event messages (events produced in response to user operations such as a mouse input, key input, and the like) with the TWAIN manager module 39. Whether or not the designated TWAIN device 37 is reserved is determined in accordance with the presence/absence of the window.

Figure 5:
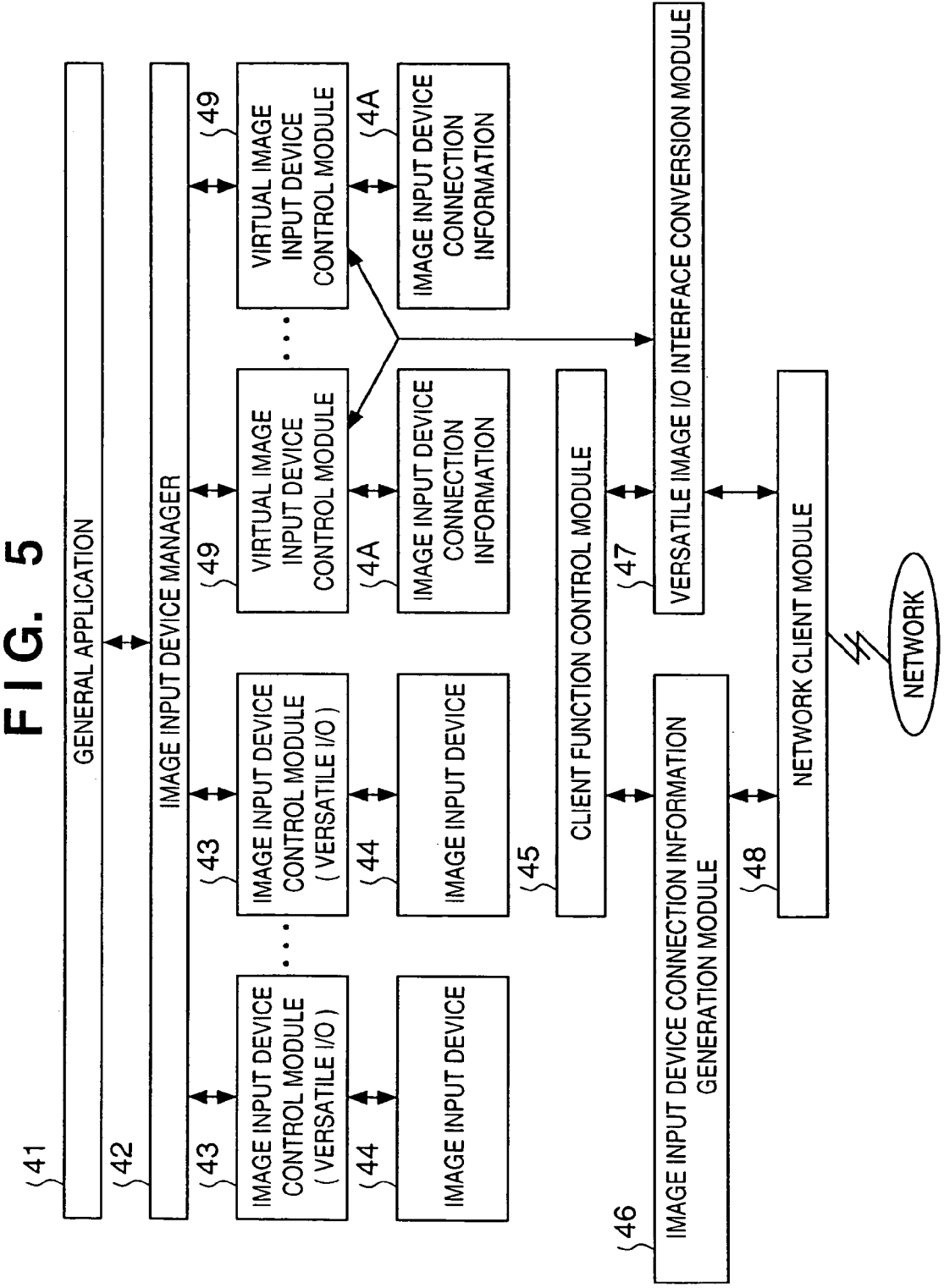
FIG. 5 is a diagram showing an example of the module arrangement of a program of the client.

FIG. 5 shows an example of the functional arrangement in the client of this embodiment. Building components 41 to 44 in FIG. 5 are required for a general application program to access an image input device locally connected to the client, and are existing programs. On the other hand, building components 45 to 4A shown in FIG. 5 are required to read an image from image input devices connected to the server in this embodiment.

Reference numeral 41 denotes a general application program having an image input function. Reference numeral 42 denotes an image I/O device manager for providing a versatile image I/O interface to the application program. The manager 42 exchanges information with a designated image input device control modules 43 or 49 under its management in accordance with an instruction from the I/O interface.

Reference numeral 43 denotes image input device control modules having versatile I/Os. These modules 43 control image input devices 44 individually connected via versatile interfaces, which are defined with the image input device manager 42. That is, the module 42 corresponds to a TWAIN manager, and the module 43 to a TWAIN driver corresponding to each device. Reference numeral 44 denotes image input devices locally connected to the client.

The elements required to scan an image from the image input device connected to the server will be explained below.

A client function control module 45 systematically manages individual modules that define client expansion functions to be described below. An image input device connection information generation module 46 acquires attribute information of image I/O devices connected to the server and information required for network connection using a network client module 48, and generates each image input device information 4A. At this time, a virtual image input device control module 49 is automatically generated. After this module is generated, the image input device manager 42 can virtually handle the devices on the network as if they were directly connected.

A versatile image I/O interface conversion module 47 converts control information, which is obtained using the network client module 48 and corresponds to the image input device on the server, into a versatile interface corresponding to the image input device manager 42. This module 47 provides a function having such interface to the image input device manager 42 via each virtual image input device control module 49 in place of providing them directly.

The network client module 48 is compatible to a versatile network protocol and converts interval data into a data format that can be exchanged on the network, so that the individual modules can communicate with those on the server side.

The virtual image input device control modules 49 are generated to have one-to-one correspondence with image input devices set on the network. This module 49 basically executes only intermediate processes such as a process for returning the corresponding image input device connection information 4A, a process for passing on that information to the versatile image I/O interface conversion module 47 and passing on that result to the image input device manager 42, and the like. In this manner, since most of actual processes are executed by the versatile image I/O interface conversion module 47, this module 49 can be small. Therefore, even when modules 49 are generated in correspondence with a plurality of image input devices on the network, the system overhead can be small.

<Example of Control Operation of Image Input Device on Network of this Embodiment>

Figure 6:
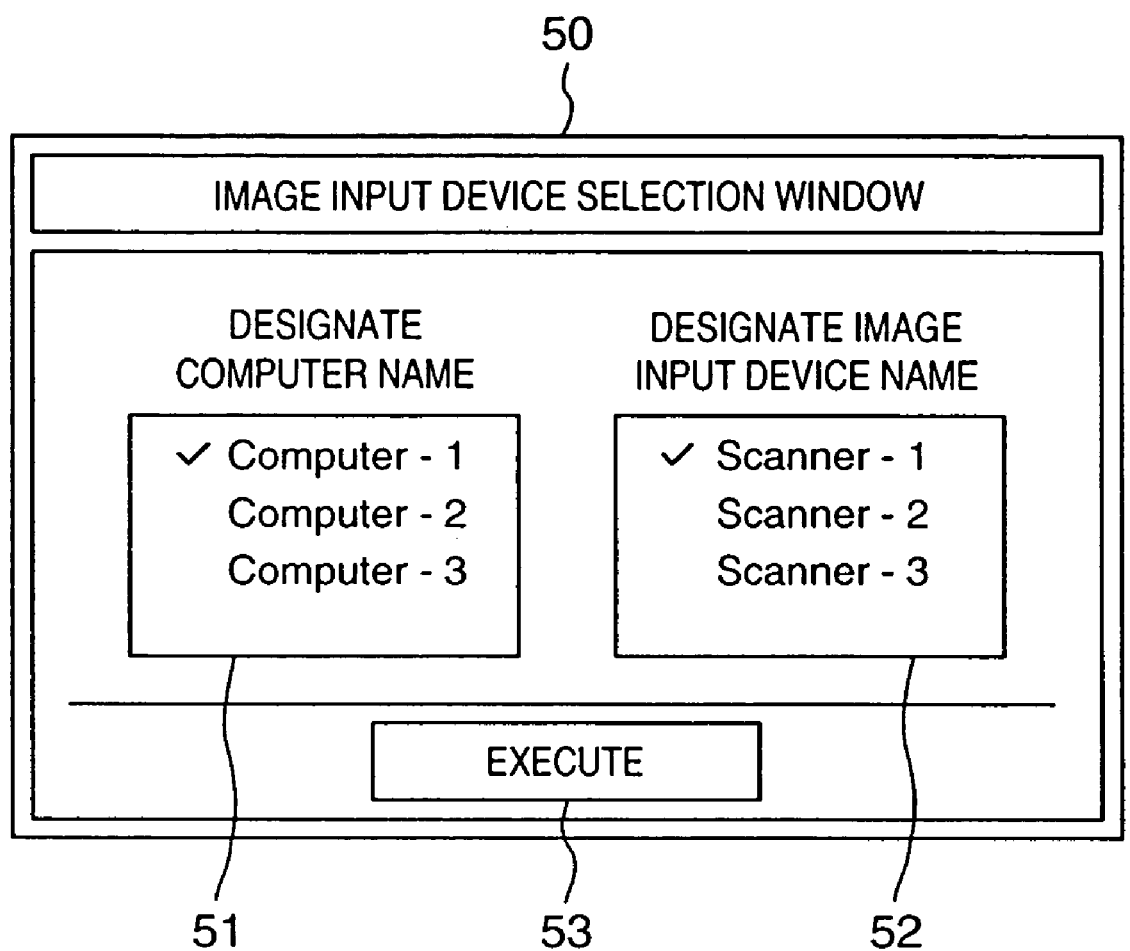
FIG. 6 shows a display example of an image input device list of the embodiments.

FIG. 6 shows the selection state of an image input device used to scan an image in this embodiment.

Reference numeral 50 denotes an image input device selection dialog, which is displayed on the CRT 13. Reference numeral 51 denotes a list box for "computer selection", which is used to designate a server to which image input devices are connected. In this embodiment, a check mark is displayed at the position of the selected computer, and all computer names connected within an identical domain to the client on the network are displayed. Reference numeral 52 denotes a list box that displays image input devices locally connected to the selected computer. In this embodiment, a check mark is also displayed at the position of the selected image input device.

Upon selecting an image input device, a pointer is moved onto the image input device name to be selected by operating the PD 10, and a button of the PD 10 is clicked at that position. Or the image input device may be selected by a key input from the keyboard 9. Reference numeral 53 denotes a button for instructing to start image input from the selected image input device. Execution of that button is instructed by the PD 10 or keyboard 9.

Figure 7:
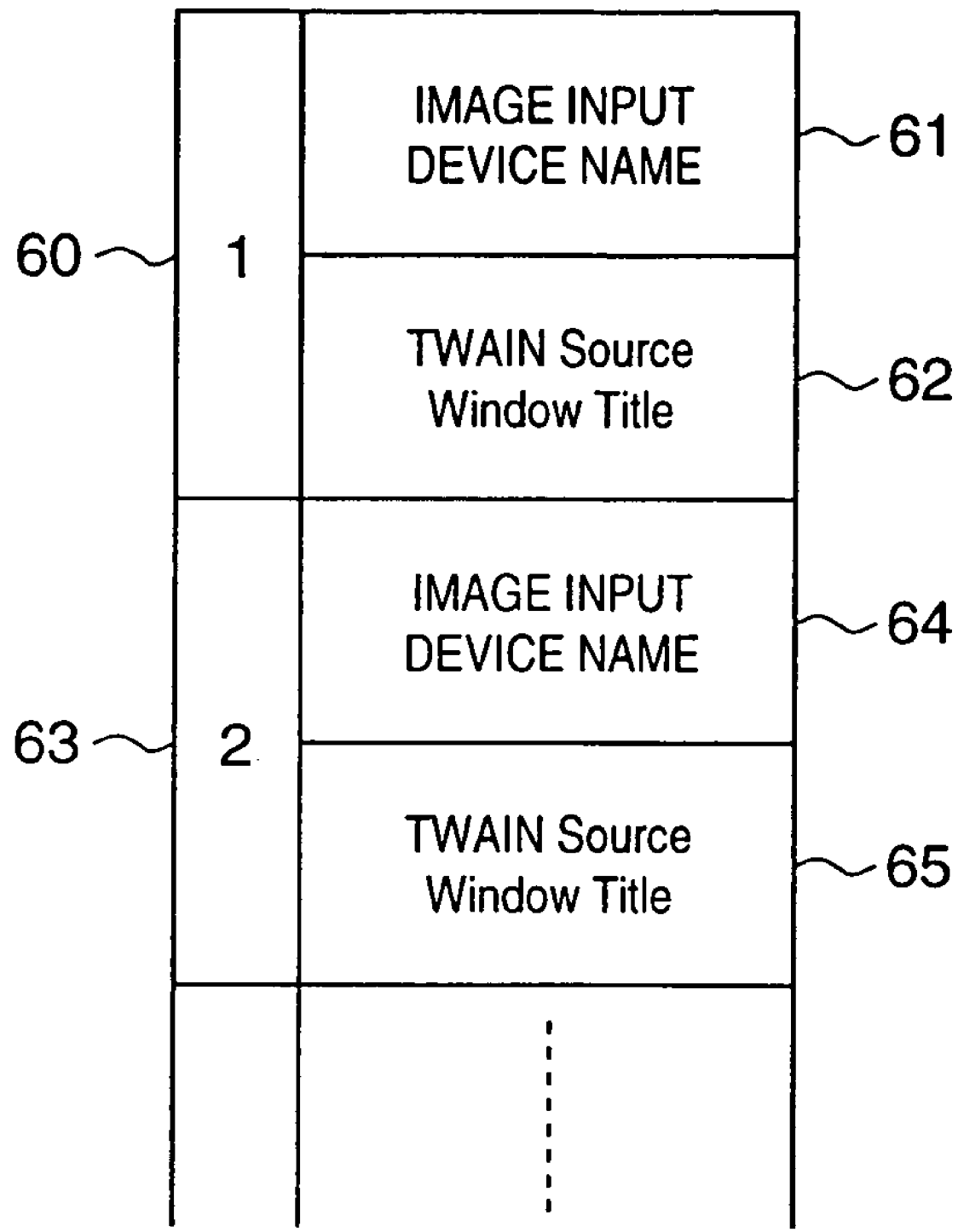
FIG. 7 shows an example of an access management table of image input devices of a device reserve state checking module of the first embodiment.

FIG. 7 shows an example of an access management table which is stored in the device reserve state checking module 38 in the server, and manages the use states of image input devices connected to the server. In this example, image input devices are TWAIN devices.

Cells 61 and 64 store the image input device names, which are the same as the names displayed in the dialog shown in FIG. 6. Cells 62 and 65 store window title names generated by TWAIN drivers 36 corresponding to the image input devices in the cells 61 and 64. Cells 60 and 63 store numbers which are assigned to areas where the window title names generated by the TWAIN drivers 36 are registered. This number is added as a new image input device is connected to the server system, and is deleted when it is disconnected.

The device reserve state checking module 38 has this access management table, extracts a window title name generated by a TWAIN driver 36 of a TWAIN device 37, which has the image input device name passed on as a parameter, with reference to this access management table every time it receives from an application a reserve state check request of that TWAIN device 37 using the image input device name as the parameter, and checks if a window with the extracted name is created on the server system, thus determining if that TWAIN device is reserved.

Figure 8:
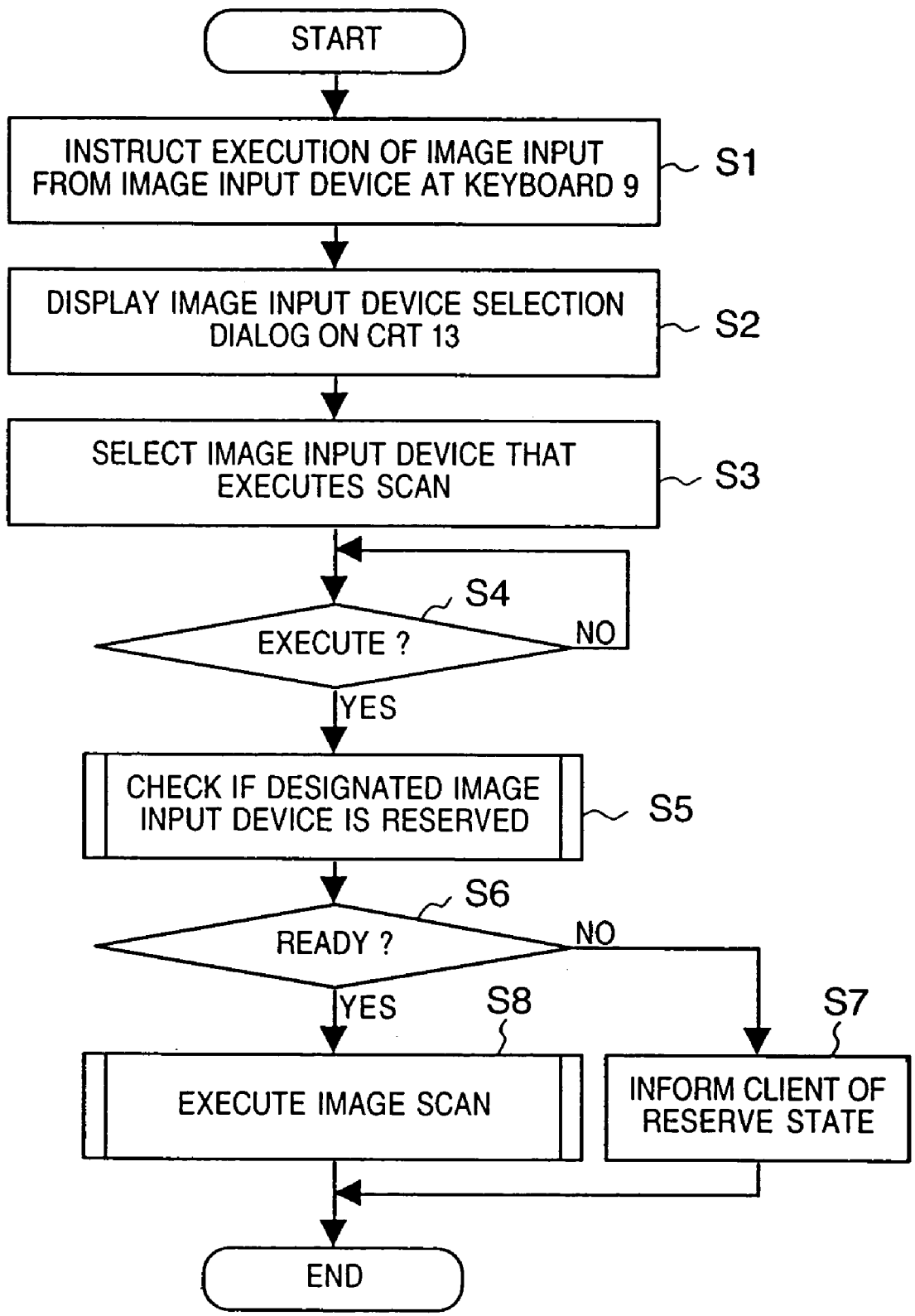
FIG. 8 is a flow chart showing an example of the processing sequence of the client upon detecting the reserve state of an image input device of the first embodiment.

FIG. 8 is a flow chart for explaining an example of the operation sequence of the image input device manager of this embodiment.

In step S1, the user instructs at the keyboard 9 to execute an image scan of the image input device. In step S2, the image input device selection dialog for executing an image scan is displayed. FIG. 6 shows this state. In this embodiment, the home computer name is displayed in the list box that displays computer names. That is, when the home computer name is selected, the names of image input devices locally connected to the home computer are displayed, and their reserve states can be checked. The image input device is selected in step S3, and it is checked in step S4 if scan execution is instructed. If NO in step S4, step S4 repeats itself; if execution is instructed, the flow advances to step S5.

In step S5, the client instructs the device reserve state checking module 38 of the server to check if the selected image input device is reserved. If the selected image input device is locally connected to the home computer, the image input device control module 43 directly checks the device reserve state without the intervention of the network. If the selected image input device is not locally connected to the home computer, the virtual image input device control module 49 instructs the device reserve state checking module 38 of the server via the network client module 48 and network to check, and the checking result of the device reserve state checking module 38 is returned to the client. Details in step S5 will be explained later with reference to FIG. 9.

The checking result is discriminated in step S6. If the selected image input device is not reserved, the flow advances to step S8 to proceed with the scan process from the selected image input device. However, if the selected image input device is reserved, the flow advances to step S7 to display on the CRT 13 of the client that the selected device is reserved, thus informing the user of the reserve state and canceling the image scan process.

In this embodiment, reserve information of an image input device is acquired by the device reserve state checking module. Alternatively, if a TWAIN driver can acquire such information, the reserve state may be checked using the TWAIN driver. Also, in the above description, the server can be designated from computers in an identical domain, but an image input device in another domain may be designated. Furthermore, the TWAIN devices have been explained as the image input devices, but image input devices having other interfaces may be used.

Figure 9:
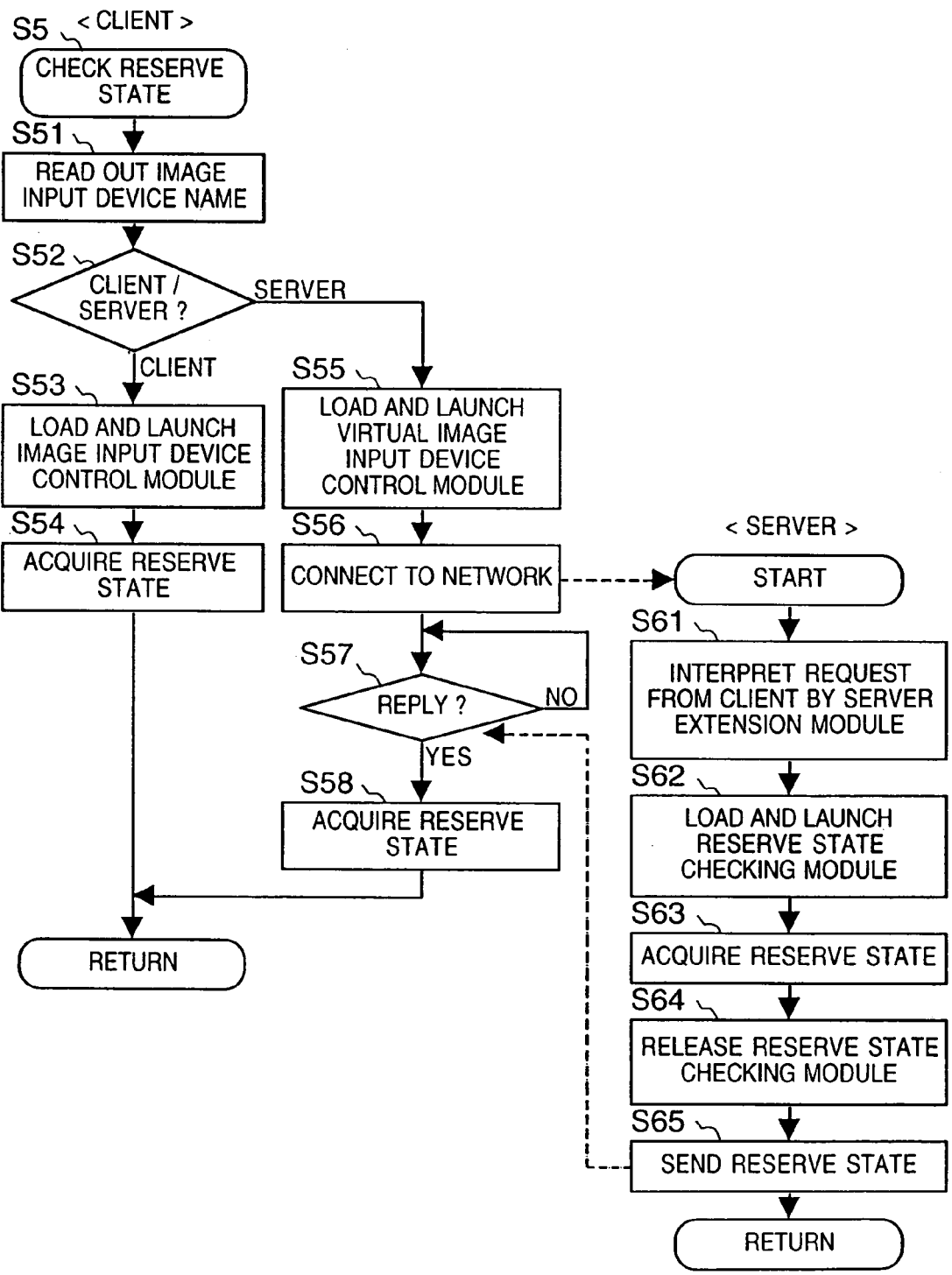
FIG. 9 is a flowchart showing an example of the processing sequence in step S5 in FIG. 8.

FIG. 9 is a flow chart showing an example of the operation of the reserve state check routine of an image input device in step S5 in FIG. 8.

In step S51, the name of the image input device to be accessed is read out. It is checked in step S52 if that image input device is connected to the home computer (client) or another server (server). If the image input device is connected to the client, the flow advances to step S53 to load and launch the image input device control module 43. In step S54, the reserve state of the image input device 44 connected to the home computer is acquired.

On the other hand, if the image input device is connected to a server, the flow advances to step S55 to load and launch the virtual image input device control module 49. In step S56, the client is connected to the server via the network on the basis of the image input device connection information 4A to send a reserve state request command. In step S57, the control waits for reply of information indicating the reserve state of the designated image input device.

The server sends back information indicating the state of the image input device connected in the following procedure. In the following description, the image scanner complies with a TWAIN interface.

Since the request from the client is sent in the HTTP protocol format, the server expansion module 32 interprets that request in step S61. If it is determined as a result of interpretation that the reserve state of the TWAIN device 37 is requested, the flow advances to step S62 to load and launch the reserve state checking module 38, which is required to detect the reserve state of the TWAIN device 37. In step S63, the reserve state checking module 38 acquires the reserve state of the TWAIN device 37 via the TWAIN manager module 39 without using the TWAIN driver 36. That is, whether or not the designated TWAIN device 37 is reserved is checked depending on the presence/absence of the window, as described above.

In step S64, the reserve state checking module 38 is released. In step S65, the server expansion module 32 generates HTML data that can be displayed on the client on the basis of the reserve information acquired in step S63, and sends the generated reserve information to the client that made access using the HTTP server module 31, thus ending the processing.

Upon receiving a reply from the server, in the client the flow advances to step S58 to receive the reserve state of the image input device sent from the server.

In this manner, step S5 shown in FIG. 8 ends.

Figure 10:
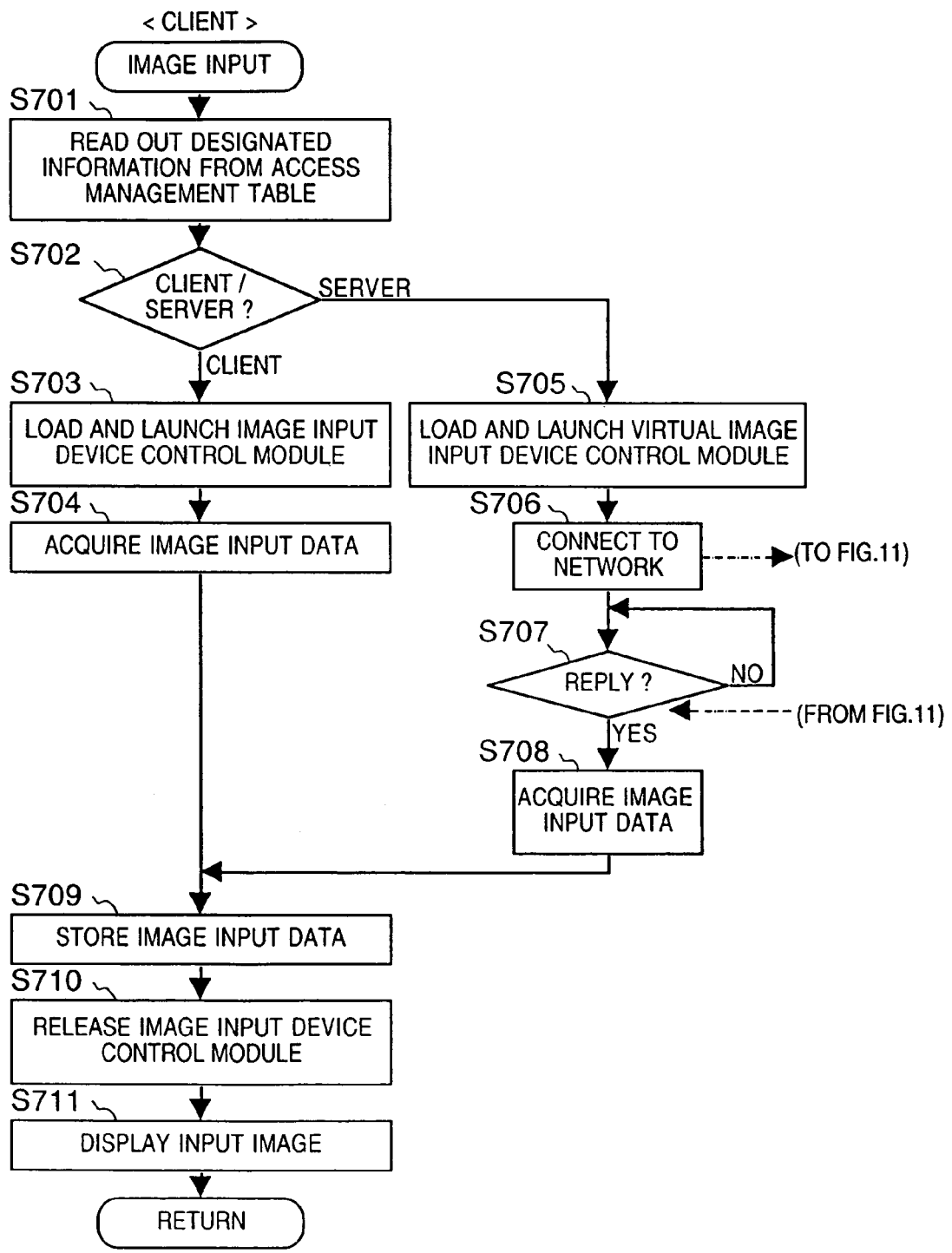
FIG. 10 is a flow chart showing an example of the processing sequence in step S8 in FIG. 8.
Figure 11:
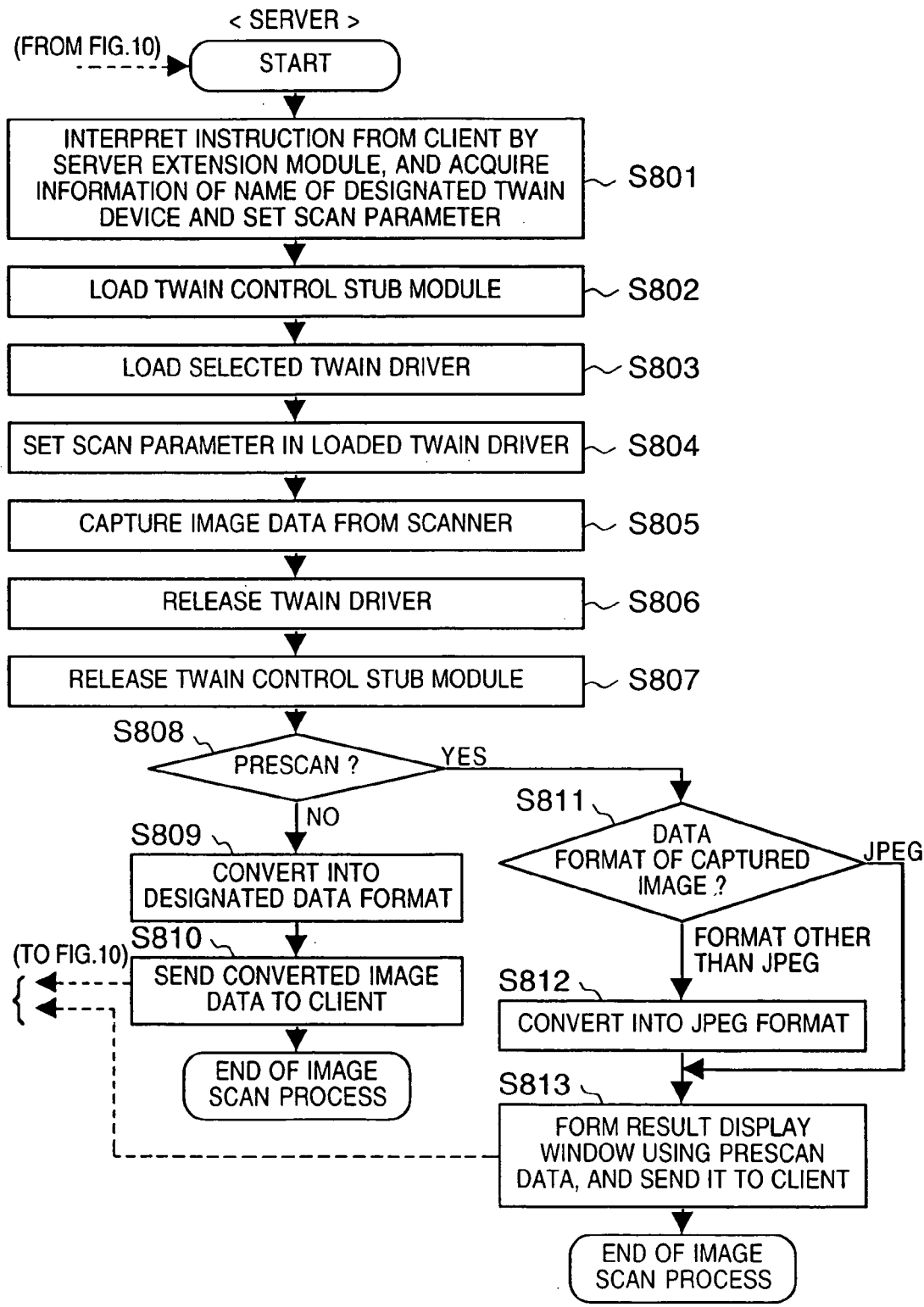
FIG. 11 is a flow chart showing an example of the processing sequence of the server in an image input process of the first embodiment.

FIGS. 10 and 11 are flow charts showing an example of the sequence in step S8 when the image input device is selected and an image input is executed in this embodiment.

In step S701, information of the selected image input device is read out from the access management table. It is checked in step S702 if that image input device is connected to the home computer (client) or another server (server). If the image input device is connected to the client, the flow advances to step S703 to load and launch the image input device control module 43. In step S704, an image input is instructed to the image input device connected to the home computer to acquire image input data.

On the other hand, if the image input device is connected to the server, the flow advances to step S705 to load and launch the virtual image input device control module 49. In step S706, the client is connected to another server via the network on the basis of the content (image input device connection information 4A) of the access management table, and sends an image input command. In step S707, the control waits for image input data sent back from the designated image input device.

The server acquires and sends back image input data from the image input device connected in the following sequence. In the following description, the image scanner complies with a TWAIN interface. Operations in a prescan and main scan (actual scan of an image) will be explained. Also, in consideration of the processing load or the data size to be sent on the network, the format of image data as a result of prescan is JPEG.

When the processing starts, since a request from the client is sent in the HTTP protocol format, the server expansion module 32 interprets the request in step S801. If it is determined that the received request is a scan request of image data from the designated TWAIN device 37, parameters set on the client side are acquired, and the flow advances to step S802. In step S802, the TWAIN control STUB module 33 required to access the TWAIN device 37 is loaded and launched.

In step S803, the TWAIN control STUB module 33 loads a TWAIN driver for controlling the corresponding TWAIN device 37 using a versatile TWAIN interface. At this time, since the TWAIN driver is launched, since it has already been determined that the corresponding scanner is ready, no error message is displayed on the display of the server PC. In step S804, scan parameters set on the client side are set in the TWAIN driver. With the processes described so far, since the TWAIN device 37 connected to the server is ready to scan, image data is captured by the TWAIN device 37 (using the versatile TWAIN interface) in step S805.

In step S806, since the image data has been captured, the previously loaded TWAIN driver is released. Also, the TWAIN control STUB module 33 is released in step S807.

It is checked in step S808 if the designated scan mode is a prescan or main scan mode. If the prescan mode is designated, the flow branches to step S811. On the other hand, if the main scan mode is designated, the flow branches to step S809.

In step S809, since the main scan mode is designated, the format of image data captured from the TWAIN device 37 is converted into that designated by the user. This process is implemented by the image data format conversion module 35 shown in FIG. 4. In step S810, the server expansion module 32 sends the converted image data to the client using the HTTP server function, thus ending the processing.

On the other hand, processes in step S811 and the subsequent steps are done to form a prescan result display window. It is checked in step S811 if the data format of the captured image data is JPEG. If YES in step S811, the flow branches to step S813; otherwise, the flow branches to step S812. In step S812, the image data captured from the TWAIN device 37 is converted into JPEG data. In step S813, the server expansion module 32 forms a preview window to be displayed on the client using the JPEG image data obtained in step S812. This information is sent using the HTTP server function, thus ending this processing.

Upon receiving a reply from the server, in the client the flow advances to step S708 to receive image input data sent from the server. In step S709, image input data obtained by the image input device connected to the home computer or server is stored. In step S710, the image input device control module 43 or 49 is released. In step S711, the acquired input image is displayed, thus ending the processing.

In the above flow chart, STUB is loaded/released in each, session to prevent memory or disk resources of the server from being wasted by a module residing in memory for a long period of time.

In this embodiment, TWAIN devices have been explained as image input devices but image input devices having other interfaces may be used.

As described above, the first embodiment can provide a shared device control method and server-client system, which start access to a connectable shared device on the network after it is checked if that device is reserved, thereby preventing unwanted situations (for example, a program on the server side displays an error message on the display screen of the server, but the client user cannot determine what has happened, the user cannot obtain a desired access result, access results in other fatal errors, and so forth) that may occur when access is started while the device is already in use by another system or the like.

When the shared device is an image input device, an undesirable image can be prevented from being scanned.

Second Embodiment

A server-client system according to the second embodiment will be explained below. The arrangement of the system is the same as that shown in FIGS. 1 to 3 above.

<Example of Functional Arrangement of Server and Client of this Embodiment>

Figure 12:
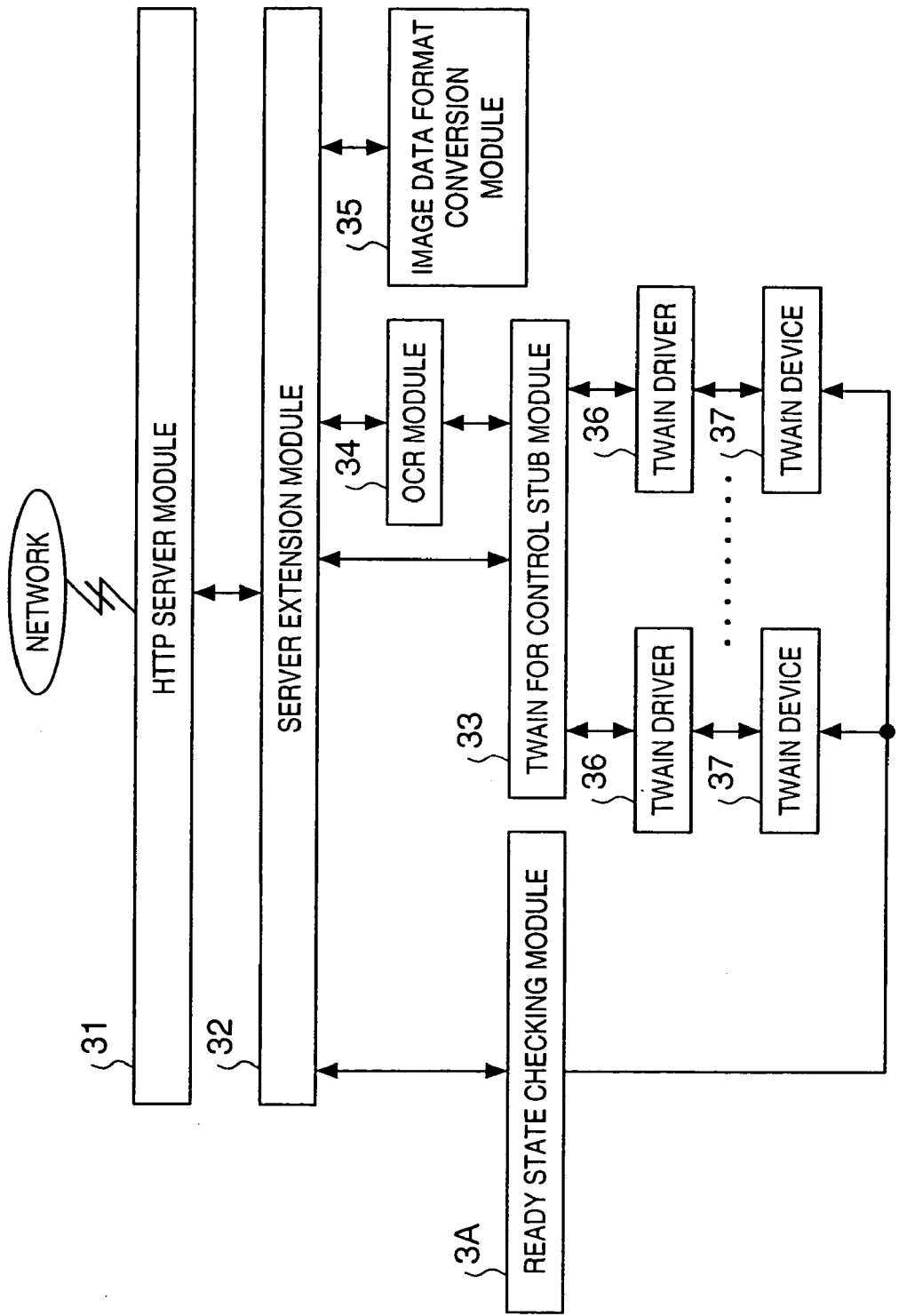
FIG. 12 is a diagram showing an example of the module arrangement of a program of the server according to the second embodiment of the present invention.

FIG. 12 shows an example of the functional arrangement in the image scanner server of this embodiment. In this embodiment, the following explanation will be given assuming that a TWAIN device having a versatile interface is used as an image scanner, and an HTTP protocol is used as a versatile network protocol for controlling exchange of scanned image data.

Reference numeral 31 denotes an HTTP server module which executes a process for transmitting data created on the server to a client using the HTTP protocol, or passing on information designated by the client to a server expansion module 32.

The server expansion module 32 interprets information passed from the HTTP server module to control a TWAIN control STUB module 33, OCR module 34, image data format conversion module 35, and device READY state checking module 3A, and finally transfers data scanned by a TWAIN device 37 connected to the server to the client using the HTTP server module 31.

The TWAIN control STUB module 33 executes a list-up process of a plurality of TWAIN drivers 36 connected via a TWAIN manager module 39, and a selection process of a TWAIN driver 36 from them in accordance with a client instruction, sets parameters in the selected driver, and passes on image data obtained as a result to the server expansion module.

The OCR module 34 is called from the server expansion module 32 and executes character recognition upon receiving a request for converting image data scanned by each TWAIN device 37 into text data from a client.

The image data format conversion module 35 converts the format of image data obtained by each TWAIN device 37 into the format designated by a client.

The TWAIN drivers 36 are modules for individually controlling a plurality of TWAIN devices 37 connected to the server.

In this embodiment, since the TWAIN control STUB module 33 communicates with these TWAIN drivers 36 using a versatile TWAIN interface, an arbitrary TWAIN device 37 (and corresponding TWAIN driver 36) can be shared on the network. The device READY state checking module 3A checks the READY state of each TWAIN device 37 without using any TWAIN driver upon receiving from the client a check request of the READY state of a device to be used via the HTTP server module 31. For example, when the TWAIN device 37 has a SCSI I/F and is connected to a SCSI port of the server, the module 3A directly issues a SCSI command to that SCSI port to check if that device is ready by discriminating the presence/absence of return information from the TWAIN device 37 and the correctness in correctness of the returned information.

The functional arrangement and the like of the client are the same as those in FIGS. 5 to 7 above.

Figure 13:
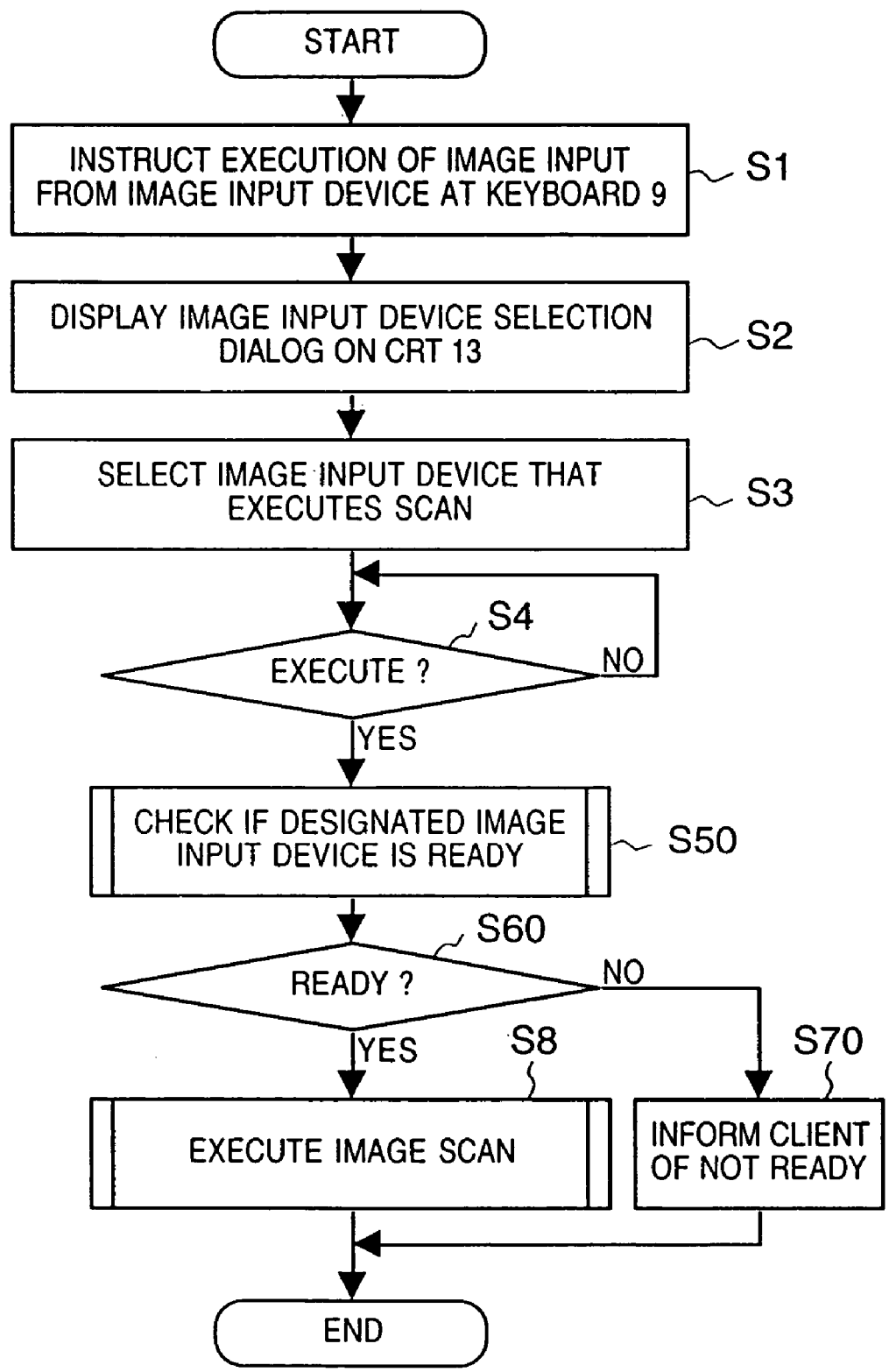
FIG. 13 is a flow chart showing an example of the processing sequence of the client upon detecting a ready state of an image input device in the second embodiment.

FIG. 13 is a flow chart for explaining an example of the image input device manager of this embodiment.

In step S1, the user instructs via the keyboard 9 to execute an image scan of the image input device. In step S2, the image input device selection dialog for executing an image scan is displayed. FIG. 6 shows this state. In this embodiment, the home computer name is displayed in the list box that displays computer names. That is, when the home computer name is selected, the names of image input devices locally connected to the home computer are displayed, and their READY states can be checked. The image input device is selected in step S3, and it is checked in step S4 if scan execution is instructed. If NO in step S4, step S4 repeats itself, and if execution is instructed, the flow advances to step S50.

In step S50, the client instructs the device READY state checking module 3A of the server to check if the selected image input device is ready. If the selected image input device is locally connected to the home computer, the image input device control module 43 directly checks the device READY state without the intervention of the network. If the selected image input device is not locally connected to the home computer, the virtual image input device control module 49 instructs the device READY state checking module 3A of the server via the network client module 48 and network to check, and the checking result of the device READY state checking module 3A of the server is returned to the client. Details in step S50 will be explained later with reference to FIG. 14.

The checking result is discriminated in step S60. If the selected image input device is not reserved, the flow advances to step S8 to proceed with the scan process from the selected image input device. However, if the selected image input device is not ready, the flow advances to step S70 to display on the CRT 13 of the client that the selected device is not ready, thus informing the user of the reserve state and canceling the image scan process.

In this embodiment, the image input devices are connected via SCSI I/Fs. However, image input devices may be connected via parallel I/Fs or USB I/Fs. Also, in the above description, the server can be designated from computers in the same domain, but an image input device in another domain may be designated. Furthermore, TWAIN devices have been explained as the image input devices, but image input devices having other interfaces may be used.

Figure 14:
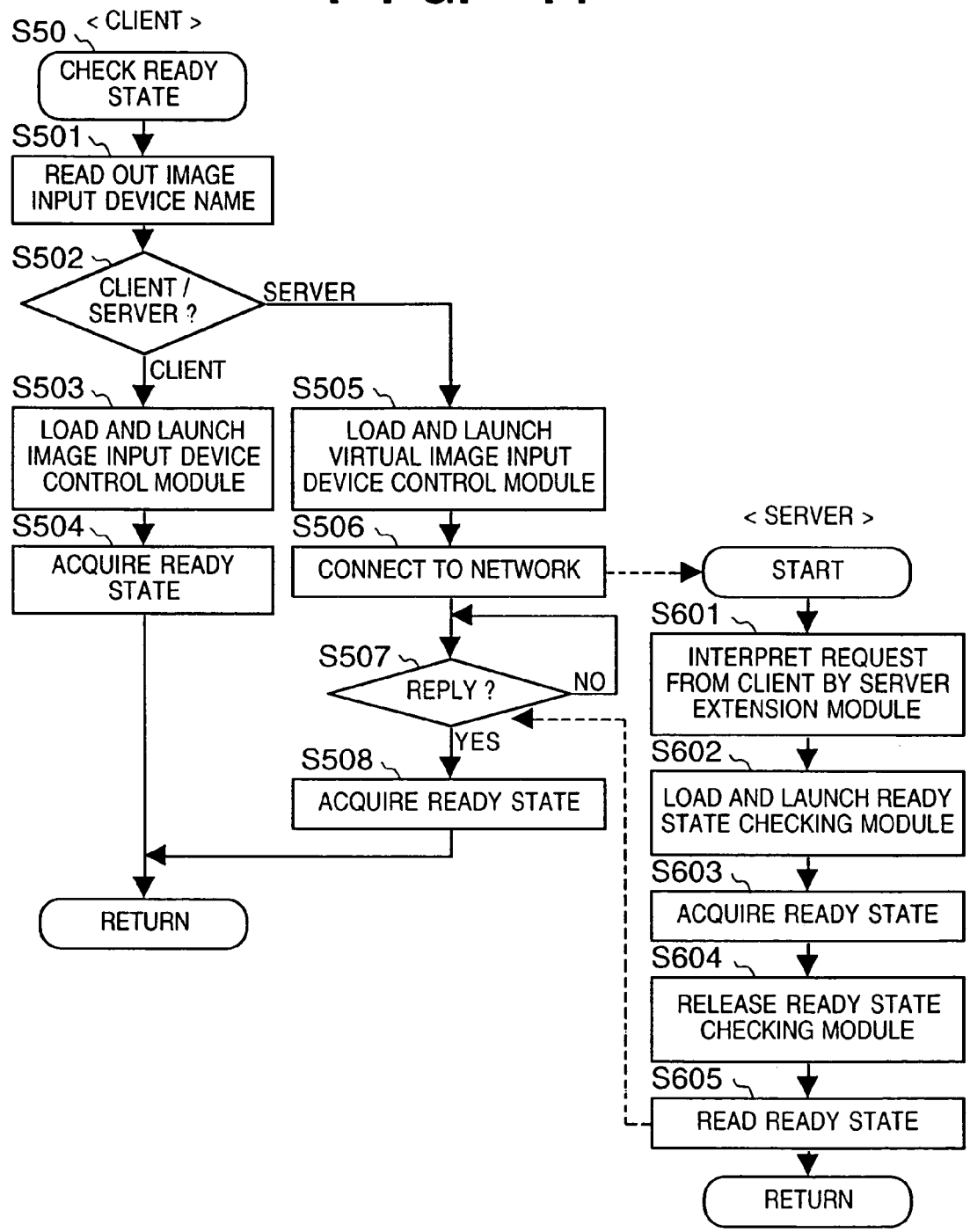
FIG. 14 is a flow chart showing an example of the processing sequence in step S50 in FIG. 13.

FIG. 14 is a flow chart showing an example of the operation of the READY state check routine of an image input device in step S50 in FIG. 13.

In step S501, the name of the image input device to be accessed is read out. It is checked in step S502 if that image input device is connected to the home computer (client) or another server (server). If the image input device is connected to the client, the flow advances to step S503 to load and launch the image input device control module 43. In step S504, the READY state of the image input device 44 connected to the home computer is acquired.

On the other hand, if the image input device is connected to the server, the flow advances to step S505 to load and launch the virtual image input device control module 49. In step S506, the client is connected to the server via the network on the basis of the image input device connection information 4A to send a READY state request command. In step S507, the control waits for reply of information indicating the READY state of the designated image input device.

The server sends back information indicating the READY state of the image input device connected in the following procedure. In the following description, the image scanner complies with a TWAIN interface.

Since the request from the client is sent in the HTTP protocol format, the server expansion module 32 interprets that request in step S601. If it is determined as a result of interpretation that the READY state of the TWAIN device 37 is requested, the flow advances to step S602 to load and launch the READY state checking module 3A, which is required to detect the READY state of the TWAIN device 37. In step S603, the READY state checking module 3A acquires the READY state of the TWAIN device 37 without using the TWAIN driver 36. That is, the module 3A extracts the SCSI ID number of a TWAIN device 37 with the image input device name passed as a parameter with reference to the access management table, issues a SCSI command to that ID number, and then checks if that device is ready by discriminating if a reply is sent back from that TWAIN device 37 and that reply returns correct information.

In step S604, the READY state checking module 3A is released. In step S605, the server expansion module 32 generates HTML data that can be displayed on the client on the basis of the reserve information acquired in step S603, and sends the generated READY information to the client that made access using the HTTP server module 31, thus ending the processing.

Upon receiving a reply from the server, in the client the flow advances to step S508 to receive the READY state of the image input device sent from the server.

In this manner, step S50 shown in FIG. 13 ends.

The sequence in step S8 executed when the image input device is selected and an image input is executed in this embodiment is the same as that shown in FIGS. 10 and 11 above.

As described above, the second embodiment can provide a shared device control method and server-client system, which start access to a connectable shared device on the network after it is checked if that device is ready, thereby preventing unwanted situations (for example, a program on the server side displays an error message on the display screen of the server, but the user cannot determine what has happened) that may occur when access is started while the device is not ready since, e.g., its power switch is OFF.

Third Embodiment

The arrangement of a server-client system according to the third embodiment is the same as that shown in FIGS. 1 to 3 above.

Figure 15:
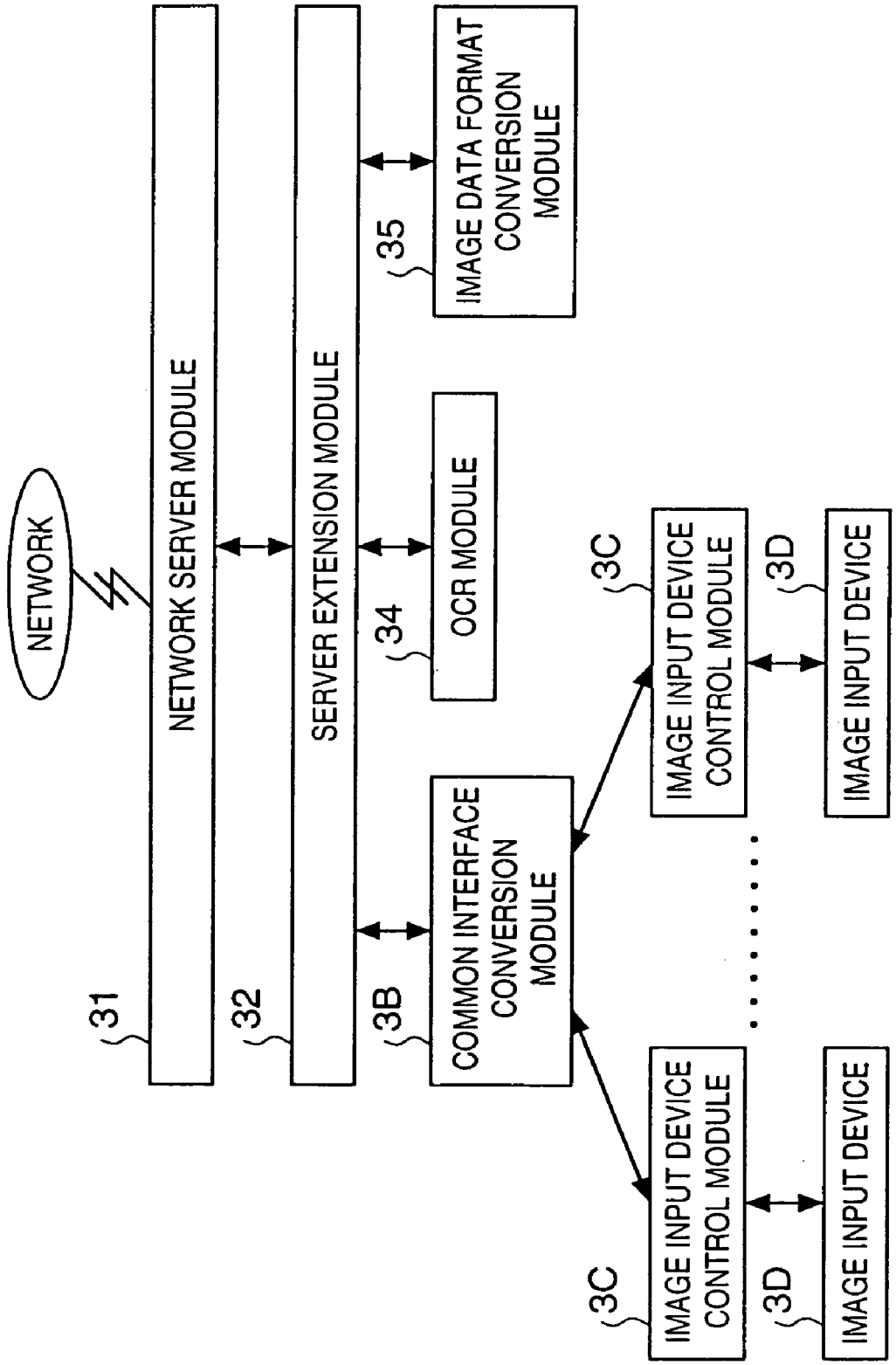
FIG. 15 is a diagram showing the arrangement of functional modules in an image input server according to the third embodiment of the present invention.

The arrangement of modules which implement respective functions associated with an image input device in an image input server according to the third embodiment will be explained below FIG. 15 is a diagram showing the arrangement of functional modules in the image input server. Referring to FIG. 15, reference numeral 31 denotes a HTTP server module which converts data received from a server expansion module 32 (to be described later) into a data format that can be exchanged on a network compatible to a versatile network protocol, and converts network data sent from a client into an internal data format that the server expansion module 32 can interpret. In this embodiment, an HTTP protocol is also used as a versatile network protocol as the first and second embodiments.

Reference numeral 32 denotes a server expansion module, which selects a designated one of a plurality of image service modules under its management by interpreting data passed on from the HTTP server module 31 so as to provide the designated service, or to pass on data from a given service module to another service module. For example, the module 32 controls an OCR module (to be described later) to call an image input device control module 3C.

Reference numeral 3B denotes a common interface conversion module, which converts a service request to some image input device from the server expansion module into a control command corresponding to a module that controls the requested image input device. Conversely, the module 33 converts device-dependent control information sent from a module that controls the image input device into a general interface that can be passed on to the server expansion module 32. For example, the former information is image scan parameter setting information from the client, and the latter information is image information obtained as a result of a scan instruction and its additional information.

Reference numeral 34 denotes an OCR module which is called from the server expansion module 32 upon receiving a request for converting image data scanned by the image input device into text data from a client. Reference numeral 35 denotes an image data format conversion module for converting the format of image data obtained from the image input device into that designated by a client. Reference numeral 3C denotes image input device control modules (for example, scanner driver) which performs control in accordance with individual image input devices 3D (for example, scanner), i.e., input/output control commands/information corresponding (dedicated) to the individual devices.

Note that the arrangement of functional modules in the client is the same as that shown in FIG. 5 above.

Processes for launching application software such as OCR or the like of the image input server from a client, and scanning a document image from an image input device (scanner) connected to the image input server in this arrangement will be explained below.

Figure 16:
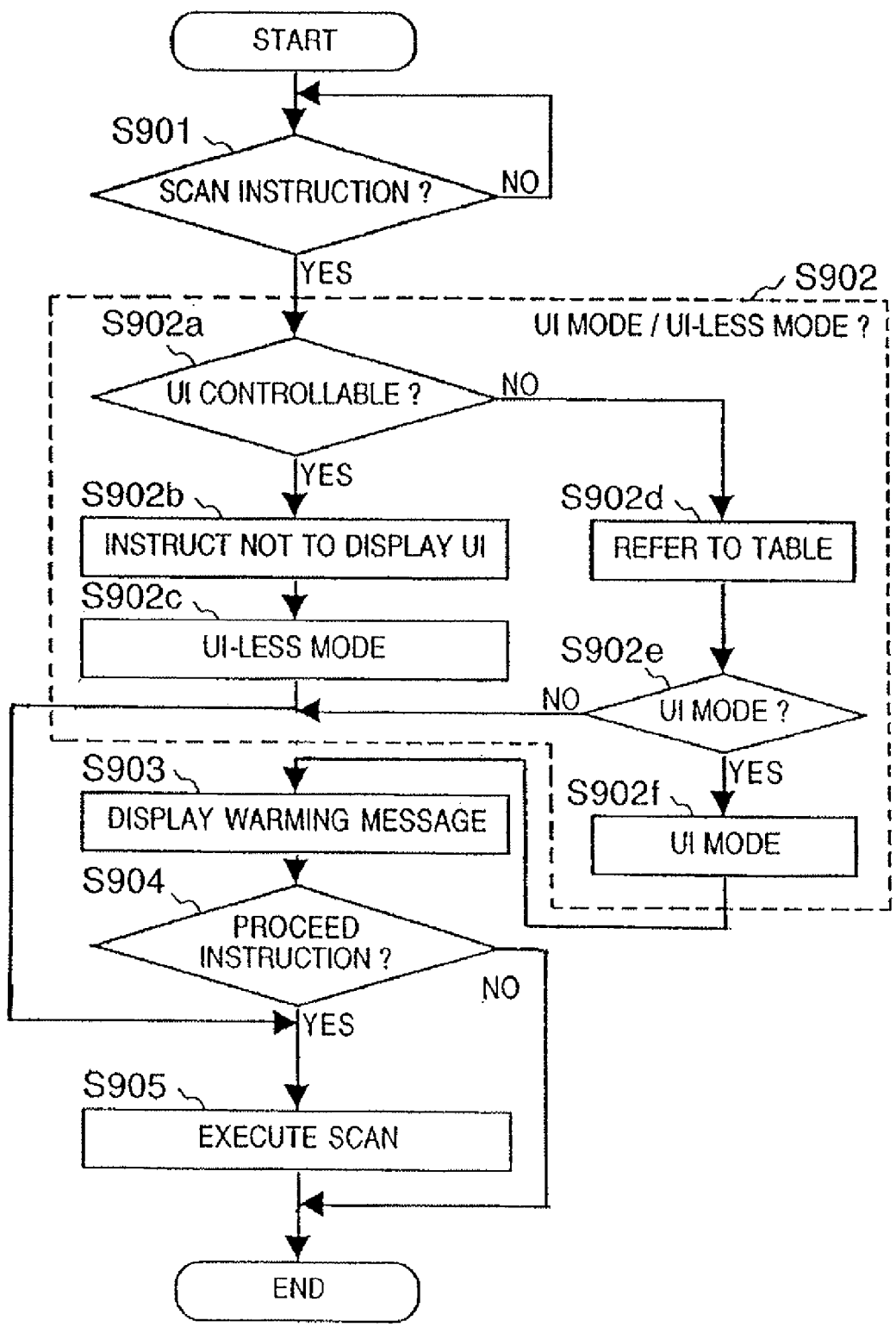
FIG. 16 is a flow chart showing the control in a client according to the third embodiment.

FIG. 16 is a flow chart showing the control in the client according to the third embodiment. If the user instructs a scan of an image input device (scanner) using application software such as OCR or the like of the image input server in step S901, the flow advances to step S902 to send this scan instruction to the image input server on the network via the communication controller 24 and communication port 25, and to judge whether the application to be executed is in UI (User Interface) mode in which a window is displayed or in UI-less mode in which no window is displayed.

In detail, it is checked in step S902a if the driver or image input device control module 3C has a window control function for switching display/non-display of a window, by taking out information of which the driver 3C informs the application 41.

When the driver 3C complies with a TWAIN interface, the presence/absence of the window control function can be checked based on the value of a CAP_UICONTROLLABLE parameter that the driver 3C outputs.

If the driver 3C has the window control function, the flow advances to step S902b to instruct the driver 3C not to display the window. When the driver 3C complies with a TWAIN interface, this instruction can be implemented by a SHOWUI parameter.

It is then determined that the scanner driver 3C is in a UI-less mode (step S902c).

At this time, the application 41 instructs to display/non-display the window on the basis of information indicating the presence/absence of the window control function from the driver 3C, but that instruction is discarded.

On the other hand, if it is determined in step S902a that the driver 3C has no window control function, the flow advances to step S902d to refer to a table which stores window modes unique to drivers having no window control function, thus checking if the driver 3C is in a UI mode (step S902e).

The processes in steps S902a to 902f are implemented by the client function control module 45. Alternatively, these processes may be implemented by the server expansion module 32, and the processing result may be acquired by the client function control module 45.

In the client, if it is determined, based on the checking result from the image input server, that the application software is in the UI mode, the flow advances to step S903 to display on the CRT 13 a warning message, e.g., "window is displayed on server; proceed with scan?". If the user instructs to cancel the scan in step S904, this processing ends.

If the application software is in the UI-less mode in step S902 or if the scan is to proceed in step S904, the flow advances to step S905, and a scan start instruction is output to the image input server on the network, thus starting the scan.

In this manner, in the image input server, the received instruction is passed on to the aforementioned server expansion module 32, and the image input device control module 3C is launched via the common interface conversion module 33. The image input device control module 3C controls the image input device 3D to scan a document image. Upon completion of the scan, an image is passed on to the application of the client via the network.

Another example of the third embodiment will be explained below with reference to the accompanying drawings.

In this example, even when the scan control (driver) for scanning an image is set in the UI mode, if another driver that supports the UI-less mode is available, an image is scanned using that driver.

Figure 17:
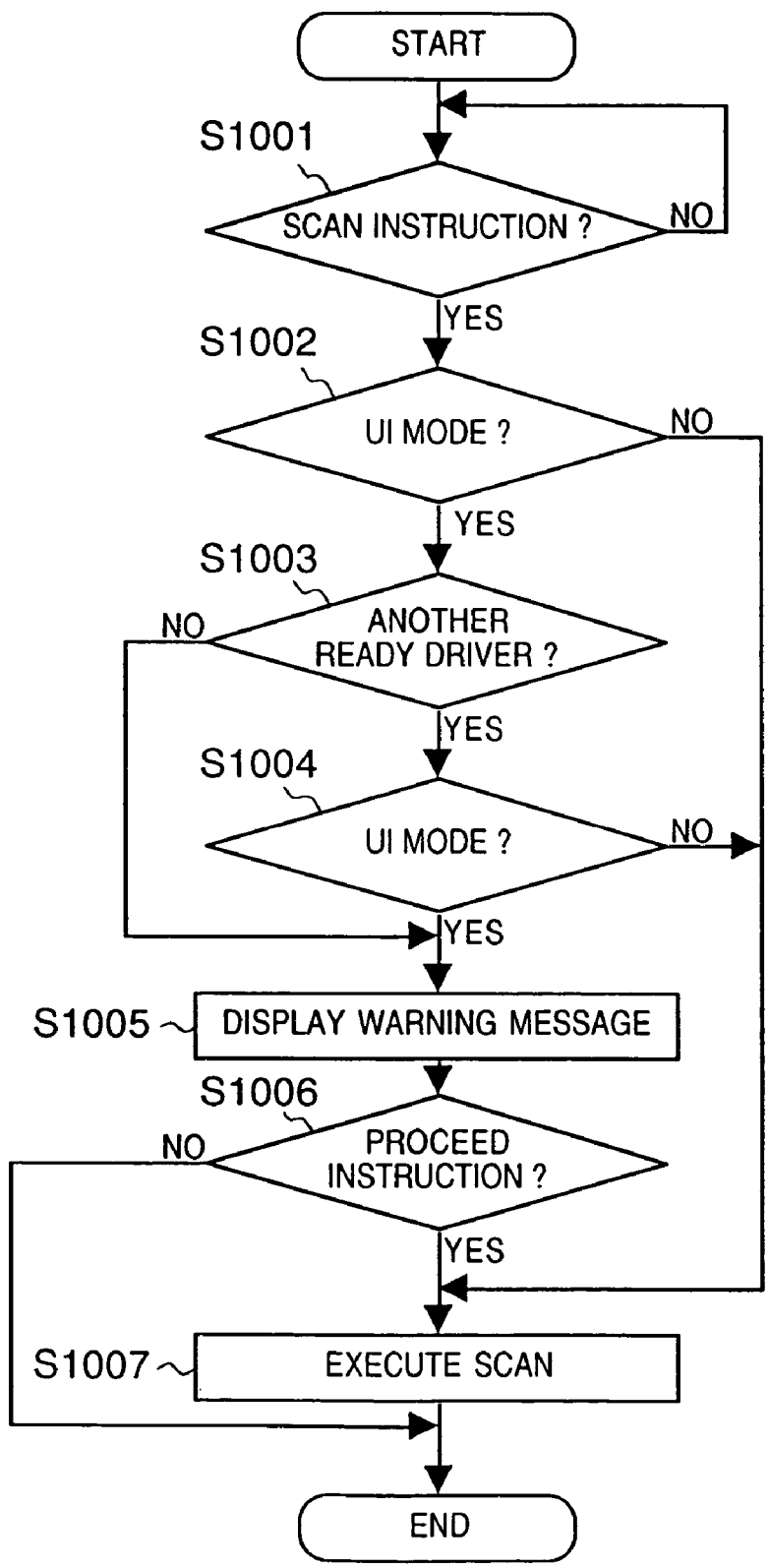
FIG. 17 is another flow chart showing the control in a client according to the third embodiment.

FIG. 17 is a flow chart showing the control in the client in this example. If the user instructs a scan from an image input device (scanner) using application software such as OCR or the like of the image input server in step S1001, the flow advances to step S1002 to send this scan instruction to the image input server on the network via the communication controller 24 and communication port 25, and the control waits for a reply from the image input server.

On the other hand, the image input server launches the designated driver, and checks if this driver supports a UI (User Interface) mode that displays a window or UI-less mode (windowless mode) that does not display any window. The server informs the client of the checking result.

In the client, if it is determined based on the checking result from the image input server that the driver is in the UI mode, the flow advances to step S1003 to inquire of the user as to whether a scan is made using another ready driver or not. If the user instructs an image scan using the other ready driver, the flow advances to step S1004. As in step S1002, if it is determined based on the checking result from the image input server in step S1004 that the other driver is in the UI mode, or if no other drivers are available in step S1003, the flow advances to step S1005 to display on the CRT 13 a warning message, e.g., "window is displayed on server; proceed with scan?". If the user instructs to cancel the scan in step S1006, this processing ends.

On the other hand, if the driver is set in the UI-less mode in step S1002 or S1004, or if the scan is to proceed in step S1006, the flow advances to step S1007, and a scan start instruction is output to the image input server on the network, thus starting the scan.

In this manner, in the image input server, the received instruction is passed on to the aforementioned server expansion module 32, and the image input device control module 3C is launched via the common interface conversion module 3B. The image input device control module 3C controls the image input device 3D to scan a document image. Upon completion of the scan, an image is passed on to the application of the client via the network.

As described above, according to this example, upon instruction, from the client, the image input device on the server side to scan, it is checked if the driver is set in the UI or UI-less mode, and if the driver is set in the UI mode, a predetermined warning message is displayed to ask the user if the scan is to proceed, thus improving the operability of the user.

As described above, according to the third embodiment, upon instructing, from a terminal connected to the network, an image input device that can be shared on the network to input an image, when the mode of the image scan process displays a window, a message indicating that this window is sent to the user, thus improving the operability of the user.

Figure 18:
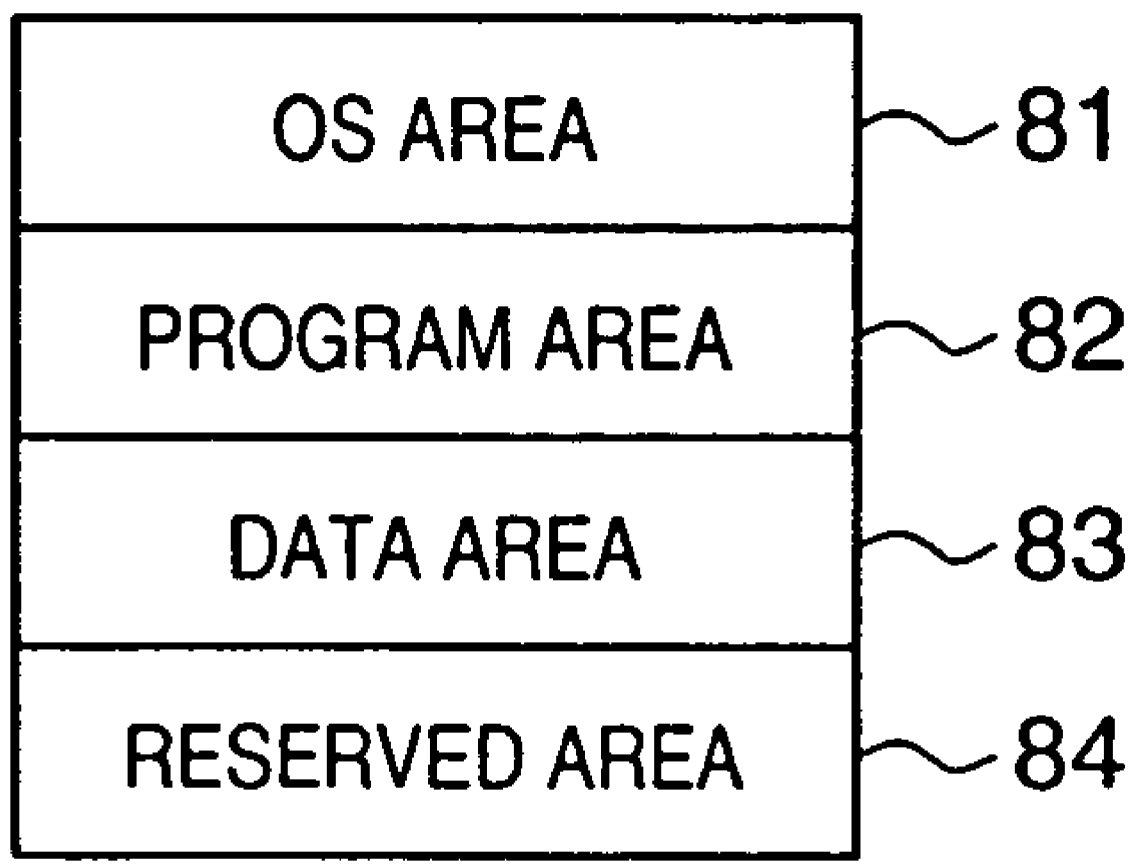
FIG. 18 shows a memory map of the embodiments.

FIG. 18 shows a memory map in which data is arranged in PMEM 3 or the server and the client.

Numeral 81 is an area occupied by operating system program, 82 is an area occupied by programs which achieve selection function of the input device, status display function of the input device, control function of the input device, server extension function, and HTTP server function, 83 is a data area which is used by various programs 82, and 84 is an empty area of PMEM3 not used.

Upper side of FIG. 18 corresponds to lower address and lower side corresponds to upper address.

Note that though above embodiments are described independently, and combination of the mentioned embodiments may be performed. Especially, the third embodiment is combined with other embodiment more effectively. The status of shared device is not limited to examples in the embodiments, but is suitable selected in accordance with a feature of the shared device.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus having a device including at least a scanner function and having a server function communicating with a client apparatus, comprising:

a recognition unit constructed to recognize an operation status indicating whether or not the scanner function of said device is available for use based on a test to communicate with the scanner function; and a communication interface having a function for composing a display data described in a structured markup language based on the recognized operation status and transmitting the display data to said client apparatus, wherein said recognition unit comprises:

a reception unit constructed to receive a request for the operation status from a device driver of the client apparatus, wherein the device driver of the client apparatus is initiated as a virtual driver of a device driver of the information processing apparatus driving the device when the client apparatus determines that a scanner function requested to the client apparatus is prepared in the device of the information processing apparatus; and an initiation unit constructed to initiate a recognition of the operation status in response to the request received from the device driver of the client apparatus executed as a virtual driver of the device driver of the information processing apparatus, wherein the recognition of the operation status is performed without initiating the device driver of the information processing apparatus.

2. The information processing apparatus according to claim 1, wherein said recognition unit obtains reserve status information indicating whether or not the scanner function of said device has been reserved as the operation status and recognizes that the scanner function of said device is available for use when said obtained reserve status information indicates that the scanner function of said device has not been reserved.

3. The information processing apparatus according to claim 1, wherein said recognition unit sends an inquiry command to a port connecting with said device and recognizes that the operating status of said device is not ready when there is no response from said device.

4. The information processing apparatus according to claim 1, wherein said structured markup language is a markup language described in text format.

5. A method for an information processing apparatus having a device including at least a scanner function and having a server function communicating with a client apparatus, comprising:

a recognition step of a recognition unit recognizing an operation status indicating whether or not the scanner function of said device is available for use based on a test to communicate with the scanner function; and a display data composing step of a communication interface composing a display data described in a structured markup language based on the recognized operation status and transmitting the display data to said client apparatus, wherein said recognition step comprises:

a reception step of a reception unit receiving a request for the operation status from a device driver of the client apparatus, wherein the device driver of the client apparatus is initiated as a virtual driver of a device driver of the information processing apparatus driving the device when the client apparatus determines that a scanner function requested to the client apparatus is prepared in the device of the information processing apparatus; and an initiation step of an initiation unit initiating a recognition of the operation status in response to the request received from the device driver of the client apparatus executed as a virtual driver of the device driver of the information processing apparatus, wherein the recognition of the operation status is performed without initiating the device driver of the information processing apparatus.

6. The method according to claim 5, wherein said recognition step obtains reserve status information indicating whether or not the scanner function of said device has been reserved as the operation status and recognizes that the scanner function of said device is available for use when said obtained reserve status information indicates that the scanner function of said device has not been reserved.

7. The method according to claim 5, wherein said recognition step sends an inquiry command to a port connecting with said device and recognizes that the operating status of said device is not ready when there is no response from said device.

8. The method according to claim 5, wherein said structured markup language is a markup language described in text format.

9. A computer-readable recording medium on which is recorded code for a computer program that executes a method for an information processing apparatus having a device including at least a scanner function and having a server function communicating with a client apparatus, the code comprising:

a recognition step of a recognition unit recognizing an operation status indicating whether or not the scanner function of said device is available for use based on a test to communicate with the scanner function; and a display data composing step of a communication interface composing a display data described in a structured markup language based on the recognized operation status and transmitting the display data to said client apparatus, wherein said recognition step comprises:

a reception step of recognizing a request for the operation status from a device driver of the client apparatus, wherein the device driver of the client apparatus is initiated as a virtual driver of a device driver of the information processing apparatus driving the device when the client apparatus determines that a scanner function requested to the client apparatus is prepared in the device of the information processing apparatus; and an initiation step of initiating a recognition of the operation status in response to the request received from the device driver of the client apparatus executed as a virtual driver of the device driver of the information processing apparatus, wherein the recognition of the operation status is performed without initiating the device driver of the information processing apparatus.

* * * * *